(12) United States Patent
Wagner et al.

(10) Patent No.: US 10,030,120 B2
(45) Date of Patent: Jul. 24, 2018

(54) SOFTENER COMPOSITION WHICH CONTAINS TETRAHYDROFURAN DERIVATIVES AND 1,2-CYCLOHEXANE DICARBOXYLIC ACID ESTERS

(71) Applicant: BASF SE, Ludwigshafen (DE)

(72) Inventors: Jochen Wagner, Ruppertsweiler (DE); Boris Breitscheidel, Waldsee (DE); Martin A. Bohn, Mannheim (DE); Benoit Blank, Edingen-Neckarhausen (DE); Alois Kindler, Grünstadt (DE)

(73) Assignee: BASF SE (DE)

( * ) Notice: Subject to any disclaimer, the term of this patent is extended or adjusted under 35 U.S.C. 154(b) by 0 days.

(21) Appl. No.: 15/101,720

(22) PCT Filed: Dec. 5, 2014

(86) PCT No.: PCT/EP2014/076694
§ 371 (c)(1),
(2) Date: Jun. 3, 2016

(87) PCT Pub. No.: WO2015/082676
PCT Pub. Date: Jun. 11, 2015

(65) Prior Publication Data
US 2016/0312004 A1 Oct. 27, 2016

(30) Foreign Application Priority Data
Dec. 6, 2013 (EP) .................... 13196036

(51) Int. Cl.
C08K 5/1535 (2006.01)
C08K 5/00 (2006.01)
C08K 5/12 (2006.01)

(52) U.S. Cl.
CPC .......... C08K 5/1535 (2013.01); C08K 5/0016 (2013.01); C08K 5/12 (2013.01)

(58) Field of Classification Search
CPC .............................. C08K 5/1535; C08K 5/12
USPC ........................................................ 524/111
See application file for complete search history.

(56) References Cited

U.S. PATENT DOCUMENTS

| 2,921,089 | A | 1/1960 | Hagemeyer, Jr. et al. |
| 3,259,636 | A | * 7/1966 | Lew ..................... C07D 307/24 549/485 |
| 3,418,351 | A | 12/1968 | Greene et al. |
| 3,932,523 | A | 1/1976 | Strohmeyer et al. |
| 4,009,124 | A | 2/1977 | Laurer et al. |
| 4,148,830 | A | 4/1979 | Pruett et al. |
| 4,426,524 | A | 1/1984 | Plummer |
| 5,288,918 | A | 2/1994 | Maher et al. |
| 5,324,853 | A | 6/1994 | Jones et al. |
| 5,434,313 | A | 7/1995 | Harrison et al. |
| 5,663,438 | A | 9/1997 | Köhler et al. |
| 5,696,297 | A | 12/1997 | Kneuper et al. |
| 5,849,972 | A | 12/1998 | Vicari et al. |
| 6,225,507 | B1 | 5/2001 | Giessler et al. |
| 6,310,235 | B1 | 10/2001 | Gick |
| 6,310,261 | B1 | 10/2001 | Geissler et al. |
| 6,437,170 | B1 | 8/2002 | Thil et al. |
| 6,723,884 | B1 | 4/2004 | Grenacher et al. |
| 6,740,773 | B2 | 5/2004 | Bohnen et al. |
| 6,765,119 | B2 | 7/2004 | Hoffmann et al. |
| 6,888,021 | B2 | * 5/2005 | Brunner .................. C07C 51/36 524/285 |
| 7,173,138 | B2 | 2/2007 | Ahlers et al. |
| 7,208,545 | B1 | 4/2007 | Brunner et al. |
| 7,355,084 | B2 | 4/2008 | Böttcher et al. |
| 7,385,075 | B2 | 6/2008 | Disteldorf et al. |
| 7,683,204 | B2 | 3/2010 | Büschken et al. |
| 7,973,194 | B1 | 7/2011 | Kinkade et al. |
| 8,044,229 | B2 | 10/2011 | Maschmeyer et al. |
| 8,207,375 | B2 | 6/2012 | Grass et al. |
| 8,943,693 | B2 | 2/2015 | Wolz |
| 9,084,983 | B2 | 7/2015 | Königsmann et al. |
| 9,090,553 | B2 | 7/2015 | Bock et al. |
| 9,133,321 | B2 | 9/2015 | Becker et al. |
| 9,156,802 | B2 | 10/2015 | Bohling et al. |
| 9,162,998 | B2 | 10/2015 | Backes et al. |
| 9,169,227 | B2 | 10/2015 | Backes et al. |
| 9,169,228 | B2 | 10/2015 | Grass et al. |
| 9,346,965 | B2 | 5/2016 | Becker et al. |
| 2010/0305250 | A1 | * 12/2010 | Colle ................... C08K 5/0016 524/112 |
| 2014/0114099 | A1 | 4/2014 | Tschirschwitz et al. |
| 2014/0128648 | A1 | 5/2014 | Prochazka et al. |

(Continued)

FOREIGN PATENT DOCUMENTS

| CA | 2908827 A1 | 11/2014 |
| CA | 2926388 A1 | 5/2015 |

(Continued)

OTHER PUBLICATIONS

International Search Report for PCT/EP2014/076694 dated Mar. 3, 2015.

Primary Examiner — Hui Chin
(74) Attorney, Agent, or Firm — Drinker Biddle & Reath LLP

(57) ABSTRACT

The invention relates to a softener composition containing at least one tetrahydrofurane derivative and at least one 1,2-cyclohexane dicarboxylic acid ester, molding compounds which contain a thermoplastic polymer or an elastomer and said type of softener composition, and to the use of said softener compositions and molding compounds.

20 Claims, 1 Drawing Sheet

(56) References Cited

U.S. PATENT DOCUMENTS

| | | |
|---|---|---|
| 2014/0371473 A1 | 12/2014 | Blank et al. |
| 2015/0166926 A1 | 6/2015 | Scherer et al. |
| 2015/0259713 A1 | 9/2015 | Piatesi et al. |
| 2015/0299607 A1 | 10/2015 | Scherer et al. |
| 2015/0307807 A1 | 10/2015 | Scherer et al. |
| 2016/0075671 A1 | 3/2016 | Wagner et al. |
| 2016/0083667 A1 | 3/2016 | Scherer et al. |
| 2016/0185896 A1 | 6/2016 | Panchenko et al. |
| 2016/0215119 A1 | 7/2016 | Wagner et al. |

FOREIGN PATENT DOCUMENTS

| | | |
|---|---|---|
| DE | 1593368 A1 | 7/1970 |
| DE | 1945359 A1 | 3/1971 |
| DE | 2139630 A1 | 2/1973 |
| DE | 2244373 A1 | 4/1974 |
| DE | 2404855 A1 | 8/1975 |
| DE | 2445303 A1 | 4/1976 |
| DE | 2612355 A1 | 10/1977 |
| DE | 2628987 A1 | 1/1978 |
| DE | 3228881 A1 | 2/1984 |
| DE | 4339713 A1 | 5/1995 |
| DE | 4429014 A1 | 2/1996 |
| DE | 102011004676 A1 | 8/2012 |
| EP | 366089 A2 | 5/1990 |
| EP | 695734 A1 | 2/1996 |
| EP | 880494 A1 | 12/1998 |
| EP | 1047655 A1 | 11/2000 |
| EP | 1266882 A1 | 12/2002 |
| GB | 1579159 A | 11/1980 |
| WO | WO-95/14647 A1 | 6/1995 |
| WO | WO-9730016 A1 | 8/1997 |
| WO | WO-9823566 A1 | 6/1998 |
| WO | WO-99/32427 A1 | 7/1999 |
| WO | WO-9936382 A1 | 7/1999 |
| WO | WO-0063151 A1 | 10/2000 |
| WO | WO-00/78704 A1 | 12/2000 |
| WO | WO-01014297 A1 | 3/2001 |
| WO | WO-01087809 A1 | 11/2001 |
| WO | WO-02/38531 A1 | 5/2002 |
| WO | WO-0283695 A1 | 10/2002 |
| WO | WO-02/100536 A1 | 12/2002 |
| WO | WO-03/029168 A2 | 4/2003 |
| WO | WO-03/029181 A1 | 4/2003 |
| WO | WO-04/09526 A1 | 1/2004 |
| WO | WO-05028407 A1 | 3/2005 |
| WO | WO-2009141166 A1 | 11/2009 |
| WO | WO-2011/023490 A1 | 3/2011 |
| WO | WO-2011/023491 A1 | 3/2011 |
| WO | WO-2011082991 A2 | 7/2011 |
| WO | WO-2012/113608 A1 | 8/2012 |
| WO | WO-2012/113609 A1 | 8/2012 |
| WO | WO-2014086702 A2 | 6/2014 |
| WO | WO-2014167108 A1 | 10/2014 |
| WO | WO-2014174416 A2 | 10/2014 |
| WO | WO-2014184013 A1 | 11/2014 |
| WO | WO-2014184068 A1 | 11/2014 |
| WO | WO-2014199306 A2 | 12/2014 |
| WO | WO-2015000858 A2 | 1/2015 |
| WO | WO-2015014644 A1 | 2/2015 |
| WO | WO-2015014651 A1 | 2/2015 |
| WO | WO-2015022183 A1 | 2/2015 |
| WO | WO-2015032794 A1 | 3/2015 |
| WO | WO-2015049345 A1 | 4/2015 |
| WO | WO-201506318 A1 | 5/2015 |

* cited by examiner

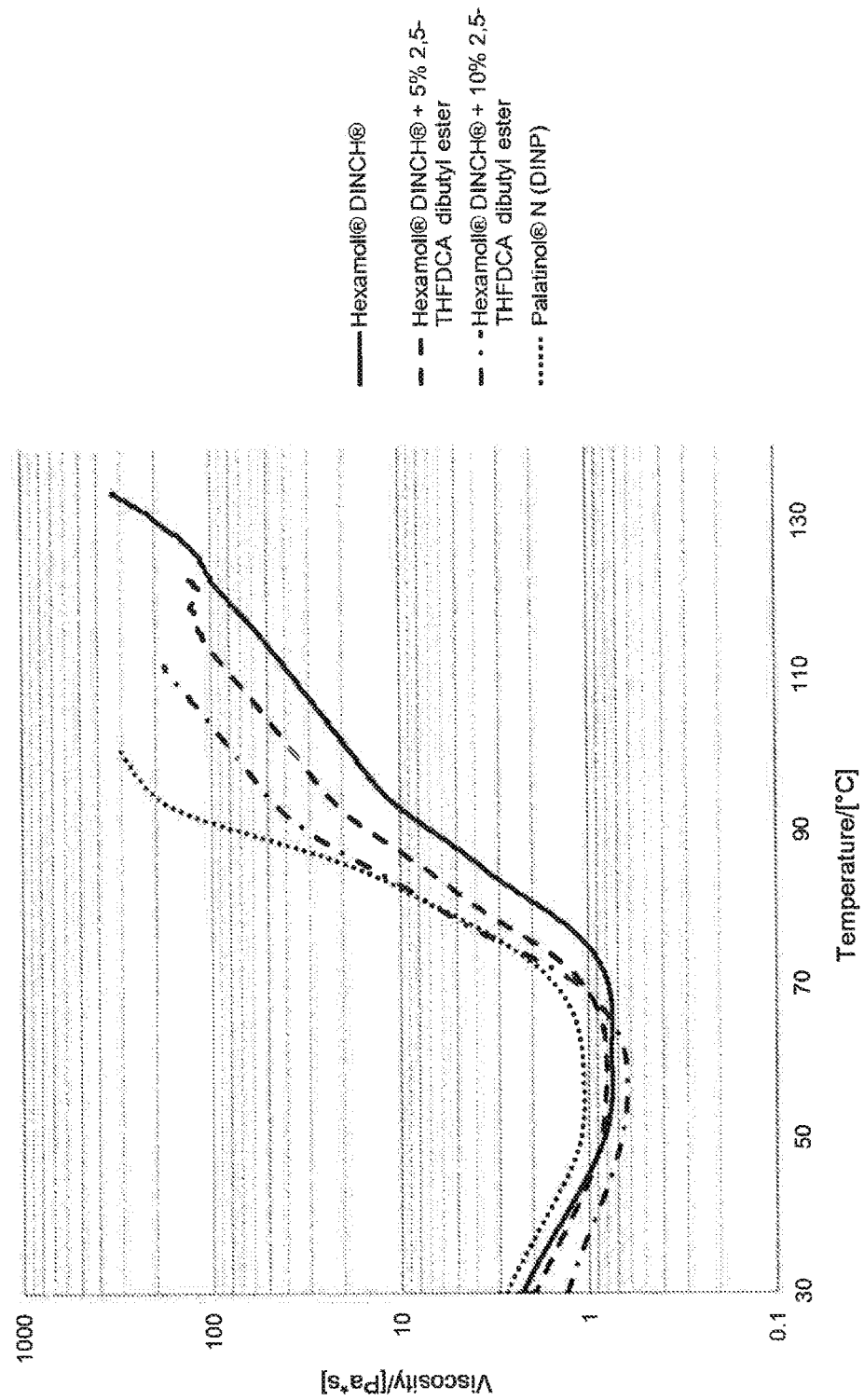

SOFTENER COMPOSITION WHICH CONTAINS TETRAHYDROFURAN DERIVATIVES AND 1,2-CYCLOHEXANE DICARBOXYLIC ACID ESTERS

CROSS-REFERENCE TO RELATED APPLICATIONS

This application is a national stage application (under 35 U.S.C. § 371) of PCT/EP2014/076694, filed Dec. 5, 2014, which claims benefit of European Application No. 13196036.1, filed Dec. 6, 2013, both of which are incorporated herein by reference in their entirety.

BACKGROUND TO THE INVENTION

The present invention relates to a plasticizer composition which comprises at least one tetrahydrofuran derivative and at least one 1,2-cyclohexanedicarboxylic ester, to molding compositions which comprise a thermoplastic polymer or an elastomer and this plasticizer composition, and to the use of these plasticizer compositions and molding compositions.

PRIOR ART

Desired processing properties or desired performance characteristics are achieved in many plastics by adding what are known as plasticizers in order to render the plastics softer, more flexible and/or more extensible. The addition of plasticizers generally serves to shift the thermoplastic region of plastics to lower temperatures, so as to obtain the desired elastic properties at lower processing temperatures and lower usage temperatures.

Production quantities of polyvinyl chloride (PVC) are among the highest of any plastic. Because this material is versatile, it is nowadays found in a wide variety of products used in everyday life. PVC therefore has very great economic importance. PVC is intrinsically a plastic that is hard and brittle up to about 80° C., and is used in the form of rigid PVC (PVC-U) by adding heat stabilizers and other additives. Flexible PVC (PVC-P) is obtained only by adding suitable plasticizers, and can be used for many applications for which rigid PVC is unsuitable.

Examples of other important thermoplastic polymers in which plasticizers are usually used are polyvinyl butyral (PVB), homo- and copolymers of styrene, polyacrylates, polysulfides, and thermoplastic polyurethanes (PUs).

The suitability of any substance for use as plasticizer for a particular polymer depends substantially on the properties of the polymer to be plasticized. Desirable plasticizers are generally those having high compatibility with the polymer to be plasticized, i.e. those which give this good thermoplastic properties, and have only low susceptibility to loss by evaporation and/or by exudation (have high permanence).

There are many different compounds marketed for plasticizing PVC and other plastics. Phthalic diesters with alcohols of different chemical structure have in the past often been used as plasticizers because they have good compatibility with PVC and advantageous performance characteristics, examples being diethylhexyl phthalate (DEHP), diisononyl phthalate (DINP) and diisodecyl phthalate (DIDP). Short-chain phthalates, e.g. dibutyl phthalate (DBP), diisobutyl phthalate (DIBP), benzyl butyl phthalate (BBP) or diisoheptyl phthalate (DIHP), are also used as rapid-gelling agents ("fast fusers"), for example in the production of what are known as plastisols. It is also possible to use dibenzoic esters, such as dipropylene glycol dibenzoates, for the same purpose alongside the short-chain phthalates. An example of another class of plasticizers with good gelling properties is that of the phenyl and cresyl esters of alkylsulfonic acids, obtainable with trademark Mesamoll®.

Plastisols initially are a suspension of finely pulverulant plastics in liquid plasticizers. The solvation rate of the polymer in the plasticizer here is very low at ambient temperature. The polymer is noticeably solvated in the plasticizer only on heating to relatively high temperatures. The individual isolated polymer aggregates here swell and fuse to give a three-dimensional high-viscosity gel. This procedure is termed gelling, and begins at a certain minimum temperature which is termed gel point or solvation temperature. The gelling step is not reversible.

Since plastisols take the form of liquids, these are very often used for the coating of a very wide variety of materials, e.g. textiles, glass nonwovens, etc. This coating is very often composed of a plurality of sublayers.

In a procedure often used in the industrial processing of plastisols, a layer of plastisol is therefore applied and then the plastic, in particular PVC, with the plasticizer is subjected to incipient gelling above the solvation temperature, thus producing a solid layer composed of a mixture of gelled, partially gelled, and ungelled polymer particles. The next sublayer is then applied to this incipiently gelled layer, and once the final layer has been applied the entire structure is processed in its entirety to give the fully gelled plastics product by heating to relatively high temperatures.

Another possibility, alongside production of plastisols, is production of dry pulverulant mixtures of plasticizer and polymers. These dry blends, in particular based on PVC, can then be further processed at elevated temperatures for example by extrusion to give pellets, or processed through conventional shaping processes, such as injection molding, extrusion, or calendering, to give the fully gelled plastics product.

Plasticizers with good gelling properties are additionally required because of increasing technical and economical demands on the processing of thermoplastic polymers and elastomers.

In particular in the production and processing of PVC plastisols, for example for producing PVC coatings, it is inter alia desirable to have available, as rapid-gelling agent, a plasticizer with low gelling point, another term used for these materials being fast fusers. High storage stability of the plastisol is moreover also desirable, i.e. the ungelled plastisol is intended to exhibit no, or only a slight, viscosity rise over the course of time at ambient temperature. As far as possible, these properties are intended to be achieved by addition of a suitable plasticizer with rapid-gelling properties, with no need for the use of other viscosity-reducing additives and/or of solvents.

However, rapid-gelling agents generally often have unsatisfactory compatibility with the polymer/additive mixtures, and likewise have unsatisfactory permanence. Another known method for establishing the desired plasticizer properties is therefore to use mixtures of plasticizers, e.g. at least one plasticizer which provides good thermoplastic properties but provides relatively poor gelling, in combination with at least one rapid-gelling agent.

There is moreover a requirement to replace at least some of the phthalate plasticizers mentioned in the introduction because these are suspected of being hazardous to health. This applies specifically to sensitive application sectors such as toys, packaging for food or drink, and medical items.

The prior art discloses various alternative plasticizers with different properties for a variety of plastics and specifically for PVC.

A plasticizer class that is known from the prior art and that can be used as alternative to phthalates is based on the cyclohexanepolycarboxylic acids described in WO 99/32427. Unlike their unhydrogenated aromatic analogs, these compounds give rise to no toxicological concerns, and can be used even in sensitive application sectors. The corresponding lower alkyl esters generally have rapid-gelling properties.

WO 00/78704 describes selected dialkylcyclohexane-1,3- and 1,4-dicarboxylic esters for the use as plasticizer in synthetic materials.

U.S. Pat. No. 7,973,194 B1 teaches the use of dibenzyl cyclohexane-1,4-dicarboxylate, benzyl butyl cyclohexane-1,4-dicarboxylate, and dibutyl cyclohexane-1,4-dicarboxylate as rapid-gelling plasticizers for PVC.

Some diether derivatives of 2,5-di(hydroxymethyl)tetrahydrofuran are already known materials. WO 2009/141166 describes a fuel composition composed of ring-hydrogenated alkylfurfuryl ethers of the general formula: R"-TF—$CH_2$—O—R, in which TF is a 2,5-disubstituted tetrahydrofuran ring, R is a hydrocarbyl group having from 1 to 20 carbon atoms, R" represents a methyl group, a hydroxymethyl group, or else the product of an aldol condensation, or represents an alkoxymethyl group of the general formula: —$CH_2$—O—R', in which R' is a hydrocarbyl group having from 1 to 20 carbon atoms. Only methyl and ethyl are specifically used as moiety R and R'. Said document claims that these compounds are novel materials, and also describes a process for producing these, but teaches only use of these as fuel or fuel additives, rather than as plasticizers.

The esters of 2,5-furandicarboxylic acid (FDCA) are another plasticizer class.

WO 2012/113608 describes $C_5$-dialkyl esters of 2,5-furandicarboxylic acid and use of these as plasticizers. These short-chain esters are specifically also suitable for producing plastisols.

WO 2012/113609 describes $C_7$-dialkyl esters of 2,5-furandicarboxylic acid and use of these as plasticizers.

WO 2011/023490 describes $C_9$-dialkyl esters of 2,5-furandicarboxylic acid and use of these as plasticizers.

WO 2011/023491 describes $C_{10}$-dialkyl esters of 2,5-furandicarboxylic acid and use of these as plasticizers.

R. D. Sanderson et al. (J. Appl. Pol. Sci., 1994, vol. 53, 1785-1793) describe the synthesis of esters of 2,5-furandicarboxylic acid and use of these as plasticizers for plastics, in particular polyvinyl chloride (PVC), polyvinyl butyral (PVB), polylactic acid (PLA), polyhydroxybutyric acid (PHB) or polyalkyl methacrylate (PAMA). Specifically, the di(2-ethylhexyl), di(2-octyl), dihexyl, and dibutyl esters of 2,5-furandicarboxylic acid are described, and the plasticizing properties of these are characterized by way of dynamic mechanical thermal analyses.

U.S. Pat. No. 3,259,636 describes a process for producing esters of cis-2,5-tetrahydrofuran dicarboxylic acid, where hydrogen, 2,5-furandicarboxylic acid and an alcohol are reacted in the presence of a noble metal catalyst in a one-pot reaction. It is moreover disclosed that the esters of alcohols having 6 or more carbon atoms are suitable as plasticizers in resin compositions.

It is an object of the present invention to provide a plasticizer composition for thermoplastic polymers and elastomers which on the one hand provides good thermoplastic properties and on the other hand provides good gelling properties, i.e. a low gel point. The plasticizer composition is intended thus to have particular suitability for providing plastisols. The plasticizer composition is intended to have high compatibility with the polymer to be plasticized, and to have high permanence, and moreover to be free from toxicological concerns.

Surprisingly, said object is achieved via a plasticizer composition comprising a) at least one compound of the general formula (I),

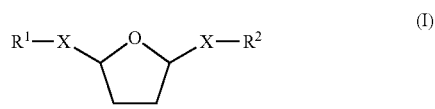

in which

X is *—(C=O)—O—, *—$(CH_2)_n$—O—, or *—$(CH_2)_n$—O—(C=O)—, where * represents the point of linkage to the tetrahydrofuran ring, and n has the value 0, 1, or 2;

and $R^1$ and $R^2$ are selected mutually independently from $C_4$-$C_5$-alkyl and $C_5$-$C_6$-cycloalkyl, where the cycloalkyl moieties are unsubstituted or can be substituted by at least one $C_1$-$C_{10}$-alkyl moiety, b) at least one compound of the general formula (II),

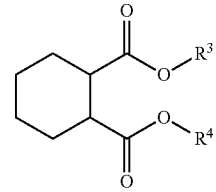

in which $R^3$ and $R^4$ are selected mutually independently from branched and unbranched $C_7$-$C_{12}$-alkyl moieties.

The invention further provides molding compositions which comprise at least one thermoplastic polymer or elastomer and one plasticizer composition as defined above and hereinafter.

The invention further provides the use of a plasticizer composition as defined above and hereinafter as plasticizer for thermoplastic polymers, in particular polyvinyl chloride (PVC), and elastomers.

The invention further provides the use of a plasticizer composition as defined above and hereinafter as plasticizer in plastisols.

The invention further provides the use of said molding compositions for the production of moldings and foils.

A BRIEF DESCRIPTION OF THE FIGURE

FIG. 1 shows the gelling behavior of PVC plastisols within each case a total proportion of 60 phr of plasticizer composition of the invention. Plasticizer compositions of the invention used here comprise the commercially available plasticizer Hexamoll® DINCH®, and various amounts of the rapid-gelling agent 2,5-THFDCA dibutyl ester. The gelling behavior of PVC plastisols which comprise exclusively the commercially available plasticizers Hexamoll®

DINCH® or Palatinol® (DINP) is also shown as comparison. The viscosity of the plastisols is presented as a function of temperature.

DESCRIPTION OF THE INVENTION

The plasticizer compositions of the invention have the following advantages:

The plasticizer compositions of the invention feature high compatibility with the polymer to be plasticized, in particular PVC.

The plasticizer compositions of the invention have high permanence, and nevertheless provide excellent gelling properties to the polymer to be plasticized.

The plasticizer compositions of the invention have advantageous suitability for achieving a wide variety of very different and complex processing properties and usage properties of plastics.

The plasticizer composition of the invention is advantageously suitable for the production of plastisols.

The compounds (I) comprised in the plasticizer composition of the invention have very good suitability as rapid-gelling agents by virtue of their extremely low solvation temperatures in accordance with DIN 53408. Even small amounts of the compounds (I) in the plasticizer composition of the invention are sufficient to reduce the temperature required for the gelling of a thermoplastic polymer and/or to increase the gelling rate thereof.

The plasticizer compositions of the invention are suitable for the use for the production of moldings and foils for sensitive application sectors, examples being medical products, packaging for food and drink, products for the interior sector, for example in dwellings and in vehicles; other examples are toys, child-care items, etc.

The compounds (I) comprised in the plasticizer compositions of the invention can be produced by using readily obtainable starting materials. One particular economic and environmental advantage consists in the possibility of utilizing not only petrochemical feedstocks available in large quantities but also renewable raw materials for the production of the compounds (I) used in the invention: by way of example, the starting materials for the furan rings are obtainable from naturally occurring carbohydrates such as cellulose and starch, while the alcohols that can be used to introduce the pendant chains are available from large-industrial-scale processes. It is therefore possible on the one hand to comply with the requirement for "sustainable" products, and on the other hand, however, also to achieve economic production.

The processes for the production of the compounds (I) used according to the invention are simple and efficient, and these can therefore be provided without difficulty on a large industrial scale.

As mentioned above, it has surprisingly been found that the compounds of the general formula (I) comprised in the plasticizer composition of the invention, in particular the $C_4$-$C_5$-dialkyl esters of tetrahydrofurandicarboxylic acid, have very low solvation temperatures, and also excellent gelling properties: solvation temperatures of these in accordance with DIN 53408 are markedly below the solvation temperatures of the corresponding dialkyl esters of phthalic acid, and they have at least equivalent rapid-gelling properties.

It has been found that the compounds (I) specifically in combination with 1,2-cyclohexanedicarboxylic esters of the general formula (II) are suitable for improving the gelling performance of thermoplastic polymers and elastomers. Even small amounts of the compounds (I) in the plasticizer composition of the invention are sufficient to reduce the temperature required for the gelling and/or to increase the gelling rate.

For the purposes of the present invention, the expression rapid-gelling agent or fast fuser means a plasticizer which has a solvation temperature in accordance with DIN 53408 below 120° C. These rapid-gelling agents are in particular used for the production of plastisols.

The compounds of the general formula (I) comprised in the plasticizer compositions of the invention can take the form either of pure cis-isomers or of pure trans-isomers or of cis/trans-isomer mixtures. The pure isomers and the isomer mixtures of any desired composition are equally suitable as rapid-gelling agents.

For the purposes of the present invention, the expression "$C_1$-$C_{10}$-alkyl" comprises straight-chain or branched $C_1$-$C_{10}$-alkyl groups. These are preferably straight-chain or branched $C_1$-$C_6$-alkyl groups. Among these are methyl, ethyl, propyl, isopropyl, n-butyl, isobutyl, sec-butyl, tert-butyl, n-pentyl, 2-pentyl, 2-methylbutyl, 3-methylbutyl, 1,2-dimethylpropyl, 1,1-dimethylpropyl, 2,2-dimethylpropyl, 1-ethylpropyl, n-hexyl, 2-hexyl, 2-methylpentyl, 3-methylpentyl, 4-methylpentyl, 1,2-dimethylbutyl, 1,3-dimethylbutyl, 2,3-dimethylbutyl, 1,1-dimethylbutyl, 2,2-dimethylbutyl, 3,3-dimethylbutyl, 1,1,2-trimethylpropyl, 1,2,2-trimethylpropyl, 1-ethylbutyl, 2-ethylbutyl, 1-ethyl-2-methylpropyl, n-heptyl, 2-heptyl, 3-heptyl, 2-ethylpentyl, 1-propylbutyl, n-octyl, and the like. It is particularly preferable that straight-chain or branched $C_1$-$C_5$-alkyl groups are involved here.

The expression "$C_4$-$C_5$-alkyl" comprises straight-chain and branched $C_4$-$C_5$-alkyl groups. It is preferable that $C_4$-$C_5$-alkyl is selected from n-butyl, isobutyl, sec-butyl, tert-butyl, n-pentyl, 2-pentyl, 2-methylbutyl, 3-methylbutyl, 1,2-dimethylpropyl, 1,1-dimethyl-propyl, 2,2-dimethylpropyl, and 1-ethylpropyl. It is particularly preferable that $C_4$-$C_5$-alkyl is n-butyl, isobutyl, or n-pentyl.

The expression "$C_7$-$C_{12}$-alkyl" comprises straight-chain and branched $C_7$-$C_{12}$-alkyl groups. It is preferable that $C_7$-$C_{12}$-alkyl is selected from n-heptyl, 1-methylhexyl, 2-methylhexyl, 1-ethylpentyl, 2-ethylpentyl, 1-propylbutyl, 1-ethyl-2-methylpropyl, n-octyl, isooctyl, 2-ethylhexyl, n-nonyl, isononyl, 2-propylhexyl, n-decyl, isodecyl, 2-propylheptyl, n-undecyl, isoundecyl, n-dodecyl, isododecyl, and the like. It is particularly preferable that $C_7$-$C_{12}$-alkyl is n-octyl, n-nonyl, isononyl, 2-ethylhexyl, isodecyl, 2-propylheptyl, n-undecyl, or isoundecyl.

The expression "$C_5$-$C_6$-cycloalkyl" comprises for the purposes of the present invention cyclic hydrocarbons having from 5 to 6, in particular having 6, carbon atoms. Among these are cyclopentyl and cyclohexyl.

Substituted $C_5$-$C_6$-cycloalkyl groups can, as permitted by their ring size, have one or more (e.g. 1, 2, 3, 4, or 5) $C_1$-$C_{10}$-alkyl substituents. Examples of substituted $C_5$-$C_6$-cycloalkyl groups are 2- and 3-methylcyclopentyl, 2- and 3-ethylcyclopentyl, 2-, 3-, and 4-methylcyclohexyl, 2-, 3-, and 4-ethylcyclohexyl, 2-, 3-, and 4-Propylcyclohexyl, 2-, 3-, and 4-isopropylcyclohexyl, 2-, 3-, and 4-butylcyclohexyl, 2-, 3-, and 4-sec-butylcyclohexyl, and 2-, 3-, and 4-tert-butylcyclohexyl.

It is preferable that the definitions of the groups X in the compounds of the general formula (I) are identical.

In a first preferred embodiment, both of the groups X in the compounds of the general formula (I) are *—(C=O)—O—.

In another preferred embodiment, both of the groups X in the compounds of the general formula (I) are *—(CH$_2$)—O—(C=O)—.

In another preferred embodiment, both of the groups X in the compounds of the general formula (I) are *—(CH$_2$)$_n$—O—, where n is 0, 1, or 2. It is particularly preferable that n is 2.

It is preferable that the moieties R$^1$ and R$^2$ in the compounds of the general formula (I) are mutually independently an unbranched or branched C$_4$-alkyl moiety.

It is particularly preferable that the moieties R$^1$ and R$^2$ in the compounds of the general formula (I) are mutually independently n-butyl or isobutyl.

In a preferred embodiment, the definitions of the moieties R$^1$ and R$^2$ in the compounds of the general formula (I) are identical.

Preferred compounds of the general formula (I) are selected from
di(n-butyl) 2,5-tetrahydrofurandicarboxylate,
di-n-butyl ether of 2,5-di(hydroxymethyl)tetrahydrofuran,
2,5-di(hydroxymethyl)tetrahydrofuran di-n-butanoate,
di(isobutyl) 2,5-tetrahydrofurandicarboxylate,
diisobutyl ether of 2,5-di(hydroxymethyl)tetrahydrofuran,
2,5-di(hydroxymethyl)tetrahydrofuran diisobutanoate,
and also mixtures of 2 or more of the abovementioned compounds.

A particularly preferred compound of the general formula (I) is di(n-butyl) 2,5-tetrahydrofurandicarboxylate.

In another preferred embodiment, the definitions of the moieties R$^3$ and R$^4$ in the compounds of the general formula (II) are identical.

It is preferable that both of the moieties R$^3$ and R$^4$ in the compounds of the general formula (II) are 2-ethylhexyl, or both are isononyl, or both are 2-propylheptyl.

A particularly preferred compound of the general formula (II) is di(isononyl) 1,2-cyclohexanedicarboxylate.

By adjusting the proportions of the compounds (I) and (II) appropriately in the plasticizer composition of the invention it is possible to match the properties of the plasticizer to the corresponding intended use. For use in specific application sectors it can optionally be helpful to add, to the plasticizer compositions of the invention, further plasticizers differing from the compounds (I) and (II). The plasticizer composition of the invention can therefore optionally comprise at least one other plasticizer differing from the compounds (I) and (II).

The additional plasticizer which differs from the compounds (I) and (II) is selected from dialkyl phthalates, alkyl aralkyl phthalates, 1,2-cyclohexanedicarboxylic esters differing from compounds (II), dialkyl terephthalates, trialkyl trimellitates, alkyl benzoates, dibenzoic esters of glycols, hydroxybenzoic esters, esters of saturated mono- and dicarboxylic acids, esters of unsaturated dicarboxylic acids, amides and esters of aromatic sulfonic acids, alkylsulfonic esters, glycerol esters, isosorbide esters, phosphoric esters, citric triesters, alkylpyrrolidone derivatives, 2,5-tetrahydrofurandicarboxylic esters which differ from compounds (I), epoxidized vegetable oils, epoxidized fatty acid monoalkyl esters, and polyesters made of aliphatic and/or aromatic polycarboxylic acids with at least dihydric alcohols.

Suitable dialkyl phthalates which can advantageously be mixed with the compounds (I) and (II) have mutually independently from 4 to 13 carbon atoms, preferably from 8 to 13 carbon atoms, in the alkyl chains. An example of a suitable alkyl aralkyl phthalate is benzyl butyl phthalate. It is preferable that suitable dialkyl terephthalates have mutually independently in each case from 4 to 13 carbon atoms, in particular from 7 to 11 carbon atoms, in the alkyl chains. Suitable 1,2-cyclohexanedicarboxylic esters differing from the compounds (II) have mutually independently in each case from 3 to 6 carbon atoms, preferably from 4 to 6 carbon atoms, in the alkyl chains. Examples of suitable dialkyl terephthalates are di(n-butyl) terephthalate, di(2-ethylhexyl) terephthalate, di(isononyl) terephthalate and di(2-propylheptyl) terephthalate. It is preferable that suitable trialkyl trimellitates have mutually independently in each case from 4 to 13 carbon atoms, in particular from 7 to 11 carbon atoms, in the alkyl chains. It is preferable that suitable alkyl benzoates have mutually independently in each case from 7 to 13 carbon atoms, in particular from 9 to 13 carbon atoms, in the alkyl chains. Examples of suitable alkyl benzoates are isononyl benzoate, isodecyl benzoate, and 2-propylheptyl benzoate. Suitable dibenzoic esters of glycols are diethylene glycol dibenzoate and dibutylene glycol dibenzoate. Examples of suitable esters of saturated mono- and dicarboxylic acids are esters of acetic acid, butyric acid, valeric acid, succinic acid or lactic acid, and the mono- and dialkyl esters of glutaric acid, adipic acid, sebacic acid, malic acid, or tartaric acid. It is preferable that suitable dialkyl adipates have mutually independently in each case from 4 to 13 carbon atoms, in particular from 6 to 10 carbon atoms, in the alkyl chains. Examples of suitable esters of unsaturated dicarboxylic acids are esters of maleic acid and of fumaric acid. Suitable alkylsulfonic esters preferably have an alkyl moiety having from 8 to 22 carbon atoms. Among these are by way of example the phenyl and cresyl esters of pentadecylsulfonic acid. Suitable isosorbide esters are isosorbide diesters, preferably esterified with C$_8$-C$_{13}$-carboxylic acids. Suitable phosphoric esters are tri-2-ethylhexyl phosphate, trioctyl phosphate, triphenyl phosphate, isodecyl diphenyl phosphate, bis(2-ethylhexyl) phenyl phosphate, and 2-ethylhexyl diphenyl phosphate. The OH group in the citric triesters can be present in free or carboxylated form, preferably in acetylated form. It is preferable that the alkyl moieties of the acetylated citric triesters have mutually independently from 4 to 8 carbon atoms, in particular from 6 to 8 carbon atoms. Alkylpyrrolidone derivatives having alkyl moieties of from 4 to 18 carbon atoms are suitable. Suitable dialkyl 2,5-tetrahydrofurandicarboxylates differing from the compounds (I) have mutually independently in each case from 7 to 13 carbon atoms, preferably from 8 to 12 carbon atoms, in the alkyl chains. Examples of suitable epoxidized vegetable oils are epoxidized fatty acids derived from epoxidized soy oil, obtainable by way of example from Galata-Chemicals, Lampertheim, Germany. Epoxidized fatty acid monoalkyl esters obtainable by way of example with trademark reFlex™ from PolyOne, USA are also suitable. The polyesters made of aliphatic and aromatic polycarboxylic acids are preferably polyesters of adipic acid with polyhydric alcohols, in particular dialkylene glycol polyadipates having from 2 to 6 carbon atoms in the alkylene moiety.

In all of the abovementioned cases, the alkyl moieties can in each case be linear or branched and in each case identical or different. Reference is made to the general descriptions relating to suitable and preferred alkyl moieties in the introduction.

The content, in the plasticizer composition of the invention, of the at least one other plasticizer differing from the compounds (I) and (II) is usually from 0 to 50% by weight, preferably from 0 to 40% by weight, particularly preferably from 0 to 30% by weight, and in particular from 0 to 25% by weight, based on the total quantity of the at least one other plasticizer and of the compounds (I) and (II) in the plasticizer composition.

In one preferred embodiment, the plasticizer composition of the invention comprises no other plasticizers differing from the compounds (I) and (II).

It is preferable that the content of compounds of the general formula (I) in the plasticizer composition of the invention is from 1 to 50% by weight, particularly from 2 to 40% by weight, and in particular from 3 to 30% by weight, based on the total quantity of the compounds (I) and (II) in the plasticizer composition.

It is preferable that the content of compounds of the general formula (II) in the plasticizer composition of the invention is from 10 to 99% by weight, particularly from 50 to 98% by weight, and in particular from 70 to 97% by weight, based on the total quantity of the compounds (I) and (II) in the plasticizer composition.

The ratio by weight of compounds of the general formula (I) to compounds of the general formula (II) in the plasticizer composition of the invention is preferably in the range from 1:100 to 1:1, particularly preferably in the range from 1:50 to 1:2, and in particular in the range from 1:30 to 1:2.

Molding Compositions

The present invention further provides a molding composition comprising at least one polymer and one plasticizer composition as defined above.

In one preferred embodiment, the polymer comprised in the molding composition is a thermoplastic polymer.

Thermoplastic polymers that can be used are any of the thermoplastically processable polymers. In particular, these are thermoplastic polymers selected from homo- and copolymers which comprise at least one copolymerized monomer selected from $C_2$-$C_{10}$-monoolefins (such as ethylene or propylene), 1,3-butadiene, 2-chloro-1,3-butadiene, vinyl alcohol and its $C_2$-$C_{10}$-alkyl esters, vinyl chloride, vinylidene chloride, vinylidene fluoride, tetrafluoroethylene, glycidyl acrylate, glycidyl methacrylate, acrylates and methacrylates of branched or unbranched $C_1$-$C_{10}$-alcohols, vinylaromatics (such as styrene), (meth)acrylonitrile, maleic anhydride, and $\alpha,\beta$-ethylenically unsaturated mono- and dicarboxylic acids,
homo- and copolymers of vinyl acetals,
polyvinyl esters,
polycarbonates (PC),
polyesters, such as polyalkylene terephthalates, polyhydroxyalkanoates (PHA), polybutylene succinates (PBS), polybutylene succinate adipates (PBSA),
polyethers,
polyether ketones,
thermoplastic polyurethanes (TPU),
polysulfides,
polysulfones,
and mixtures thereof.

Mention may be made by way of example of polyacrylates having identical or different alcohol moieties from the group of the $C_4$-$C_8$-alcohols, particularly of butanol, hexanol, octanol, and 2-ethylhexanol, polymethyl methacrylate (PMMA), methyl methacrylate-butyl acrylate copolymers, acrylonitrile-butadiene-styrene copolymers (ABSs), ethylene-propylene copolymers, ethylene-propylene-diene copolymers (EPDMs), polystyrene (PS), styrene-acrylonitrile copolymers (SANs), acrylonitrile-styrene-acrylate (ASA) copolymers, styrene-butadiene-methyl methacrylate copolymers (SBM-MAs), styrene-maleic anhydride copolymers, styrene-methacrylic acid copolymers (SMAs), polyoxymethylene (POM), polyvinyl alcohol (PVAL), polyvinyl acetate (PVA), polyvinyl butyral (PVB), polycaprolactone (PCL), polyhydroxybutyric acid (PHB), polyhydroxyvaleric acid (PHV), polylactic acid (PLA), ethylcellulose (EC), cellulose acetate (CA), cellulose propionate (CP), and cellulose acetate/butyrate (CAB).

It is preferable that the at least one thermoplastic polymer comprised in the molding composition of the invention is polyvinyl chloride (PVC), polyvinyl butyral (PVB), homo- and copolymers of vinyl acetate, homo- and copolymers of styrene, or is polyacrylates, thermoplastic polyurethanes (TPUs), or polysulfides.

Quantities of plasticizer used differ in accordance with the thermoplastic polymer or thermoplastic polymer mixture comprised in the molding composition. Total plasticizer content in the molding composition is generally from 0.5 to 300 phr (parts per hundred resin=parts by weight per hundred parts by weight of polymer), preferably from 0.5 to 130 phr, particularly preferably from 1 to 35 phr.

Specifically, the at least one thermoplastic polymer comprised in the molding composition of the invention is polyvinyl chloride (PVC).

Polyvinyl chloride is obtained via homopolymerization of vinyl chloride. The polyvinyl chloride (PVC) used in the invention can by way of example be produced via suspension polymerization, microsuspension polymerization, emulsion polymerization, or bulk polymerization. The production of PVC via polymerization of vinyl chloride, and also the production and composition of plasticized PVC, are described by way of example in "Becker/Braun, Kunststoff-Handbuch" [Plastics Handbook], vol. 2/1: Polyvinylchlorid [Polyvinyl chloride], 2nd edn., Carl Hanser Verlag, Munich.

The K value, which characterizes the molar mass of the PVC, and is determined in accordance with DIN 53726, is mostly from 57 to 90 for the PVC plasticized in the invention, preferably from 61 to 85, in particular from 64 to 75.

For the purposes of the invention, the content (% by weight) of PVC in the molding compositions of the invention is from 20 to 95%, preferably from 45 to 90%, and in particular from 50 to 85%.

If the thermoplastic polymer in the molding compositions of the invention is polyvinyl chloride, total plasticizer content in the molding composition is from 1 to 300 phr, preferably from 5 to 130 phr, particularly preferably from 10 to 120 phr, and in particular from 15 to 100 phr.

The present invention further provides molding compositions comprising at least one elastomer and at least one plasticizer composition as defined above.

It is preferable that the elastomer comprised in the molding compositions of the invention is at least one natural rubber (NR), at least one synthetic rubber, or a mixture thereof. Examples of preferred synthetic rubbers are polyisoprene rubber (IR), styrene-butadiene rubber (SBR), butadiene rubber (BR), nitrile-butadiene rubber (NBR) and chloroprene rubber (CR).

Preference is given to rubbers or rubber mixtures which can be vulcanized by sulfur.

For the purposes of the invention, the content (% by weight) of elastomer in the molding compositions of the invention is from 20 to 95%, preferably from 45 to 90%, and in particular from 50 to 85%.

For the purposes of the invention, the molding compositions which comprise at least one elastomer can comprise other suitable additives, in addition to the above constituents. By way of example, the materials may comprise reinforcing fillers, such as carbon black or silicon dioxide, other fillers, a methylene donor, such as hexamethylenetetramine (HMT), a methylene acceptor, such as phenolic resins modified with Cardanol (from cashew nuts), a vulcanizing agent or crosslinking agent, a vulcanizing accelerator or crosslinking accelerator, activators, various types of oil, antioxidants, and other various additives which by way of example can be mixed into tire compositions and into other rubber compositions.

If the polymer in the molding compositions of the invention consists of rubbers, the content of the inventive plasticizer composition as defined above in the molding composition is from 1 to 60 phr, preferably from 1 to 40 phr, particularly preferably from 2 to 30 phr.

Molding Composition Additives

For the purposes of the invention, the molding compositions comprising at least one thermoplastic polymer can comprise other suitable additives. By way of example, the materials can comprise lubricants, fillers, pigments, flame retardants, light stabilizers and other stabilizers, blowing agents, polymeric processing aids, impact modifiers, optical brighteners, antistatic agents, or biostabilizers.

Some suitable additives are described in more detail below. However, the examples listed do not represent any restriction of the molding compositions of the invention, but instead serve merely for illustration. All data relating to content are in % by weight, based on the entire molding composition.

Stabilizers that can be used are any of the conventional PVC stabilizers in solid and liquid form, for example conventional Ca/Zn, Ba/Zn, Pb, or Sn stabilizers, and also acid-binding phyllosilicates, such as hydrotalcite.

The molding compositions of the invention can have from 0.05 to 7% content of stabilizers, preferably from 0.1 to 5%, particularly preferably from 0.2 to 4%, and in particular from 0.5 to 3%.

Lubricants are intended to be effective between the PVC pastilles, and to counteract frictional forces during mixing, plastification, and deformation.

The molding compositions of the invention can comprise, as lubricants, any of the lubricants conventionally used for the processing of plastics. Examples of those that can be used are hydrocarbons, such as oils, paraffins, and PE waxes, fatty alcohols having from 6 to 20 carbon atoms, ketones, carboxylic acids, such as fatty acids and montanic acid, oxidized PE wax, metal salts of carboxylic acids, carboxamides, and also carboxylic esters, for example with the following alcohols: ethanol, fatty alcohols, glycerol, ethanediol, and pentaerythritol, and with long-chain carboxylic acids as acid component.

The molding compositions of the invention can have from 0.01 to 10% lubricant content, preferably from 0.05 to 5%, particularly preferably from 0.1 to 3%, and in particular from 0.2 to 2%.

Fillers have an advantageous effect primarily on the compressive strength, tensile strength, and flexural strength, and also the hardness and heat resistance, of plasticized PVC.

For the purposes of the invention, the molding compositions can also comprise fillers such as carbon black and other organic fillers such as natural calcium carbonates, for example chalk, limestone, and marble, dolomite, silicates, silica, sand, diatomaceous earth, aluminum silicates, such as kaolin, mica, and feldspar, and synthetic calcium carbonates. It is preferable to use the following as fillers: calcium carbonates, chalk, dolomite, kaolin, silicates, talc powder, or carbon black.

The molding compositions of the invention can have from 0.01 to 80% content of fillers, preferably from 0.1 to 60%, particularly preferably from 0.5 to 50%, and in particular from 1 to 40%.

The molding compositions of the invention can also comprise pigments in order to adapt the resultant product to be appropriate to various possible uses.

For the purposes of the present invention, it is possible to use either inorganic pigments or organic pigments. Examples of inorganic pigments that can be used are cobalt pigments, such as $CoO/Al_2O_3$, and chromium pigments, such as $Cr_2O_3$. Examples of organic pigments that can be used are monoazo pigments, condensed azo pigments, azomethine pigments, anthraquinone pigments, quinacridones, phthalocyanine pigments, dioxazine pigments, and aniline pigments.

The molding compositions of the invention can have from 0.01 to 10% content of pigments, preferably from 0.05 to 5%, particularly preferably from 0.1 to 3%, and in particular from 0.5 to 2%.

In order to reduce flammability and to reduce smoke generation during combustion, the molding compositions of the invention can also comprise flame retardants.

Examples of flame retardants that can be used are antimony trioxide, phosphate esters, chloroparaffin, aluminum hydroxide, boron compounds, molybdenum trioxide, ferrocene, calcium carbonate, and magnesium carbonate.

The molding compositions of the invention can have from 0.01 to 10% content of flame retardants, preferably from 0.1 to 8%, particularly preferably from 0.2 to 5%, and in particular from 0.5 to 2%.

The molding compositions can also comprise light stabilizers, e.g. UV absorbers, in order to protect items produced from the molding compositions of the invention from surface damage due to the effect of light.

For the purposes of the present invention it is possible by way of example to use hydroxybenzophenones, hydroxyphenylbenzotriazoles, cyanoacrylates, or hindered aminine light stabilizers (HALS), for example the derivatives of 2,2,6,6-tetramethylpiperidine as light stabilizers.

The molding compositions of the invention can have from 0.01 to 7% content of light stabilizers, e.g. UV absorbers, preferably from 0.1 to 5%, particularly preferably from 0.2 to 4%, and in particular from 0.5 to 3%.

Production of the Compounds of the General Formula (I)

The production of the compounds of the general formula (I) comprised in the plasticizer compositions of the invention is described below.

Production of the diesters of 2,5-tetrahydrofurandicarboxylic acid

Compounds of the general formula (I.1),

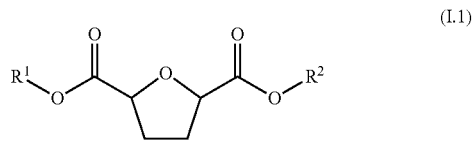

in which the definitions of $R^1$ and $R^2$ are as above, are obtainable via a process where
a) optionally 2,5-furandicarboxylic acid or an anhydride or acyl halide thereof is reacted with a $C_1$-$C_3$-alkanol in the presence of a catalyst to give a di($C_1$-$C_3$-alkyl) 2,5-furandicarboxylate, b1) 2,5-furandicarboxylic acid or an anhydride or acyl halide thereof, or the di($C_1$-$C_3$-alkyl) 2,5-furandicarboxylate obtained in step a), is reacted with at least one alcohol $R^1$—OH and, if $R^1$ and $R^2$ are different, also with at least one alcohol $R^2$—OH, in the presence of at least one catalyst to give a compound of the formula (I.1a),

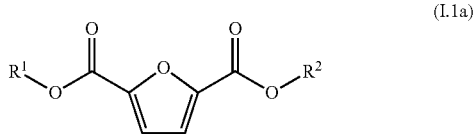

(I.1a)

c1) the compound (I.1a) obtained in step b1) is hydrogenated with hydrogen in the presence of at least one hydrogenation catalyst to give the compound of the general formula (I.1),
or
b2) 2,5-furandicarboxylic acid or the di($C_1$-$C_3$-alkyl) 2,5-furandicarboxylate obtained in step a) is hydrogenated with hydrogen in the presence of at least one hydrogenation catalyst to give a compound of the general formula (I.1b),

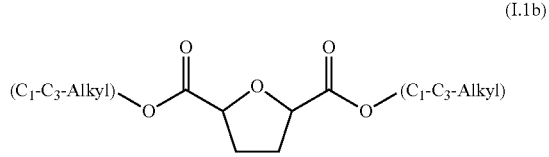

(I.1b)

c2) the compound (I.1b) obtained in step b2) is reacted with at least one alcohol $R^1$—OH and, if $R^1$ and $R^2$ are different, also with at least one alcohol $R^2$—OH, in the presence of a catalyst to give a compound of the formula (I.1).

In respect of suitable and preferred embodiments of the moieties $R^1$ and $R^2$, reference is made to the entirety of the information provided above.

The process permits the production of the 2,5-tetrahydrofurandicarboxylic esters of the general formula (I.1) by two different routes (hereinafter termed variant 1 and variant 2).

Examples of $C_1$-$C_3$-alkanols suitable for use in step a) are methanol, ethanol, n-propanol, and mixtures thereof.

In variant 1 of the process, the 2,5-furandicarboxylic acid or the di($C_1$-$C_3$-alkyl) 2,5-furandicarboxylate obtained in step a) is subjected to esterification or transesterification with at least one alcohol $R^1$—OH and, if $R^1$ and $R^2$ are different, also with at least one alcohol $R^2$—OH, to give the compounds of the formula (I.1a), which are then hydrogenated to give compounds of the general formula (I.1) (step c1)).

In variant 2, the 2,5-furandicarboxylic acid or the 2,5-di($C_1$-$C_3$-alkyl) furandicarboxylate obtained in step a) is first hydrogenated to give 2,5-tetrahydrofurandicarboxylic acid or, respectively, a compound of the general formula (I.1b) (step b2)), and the hydrogenation product is then reacted with at least one alcohol $R^1$—OH and, if $R^1$ and $R^2$ are different, also with at least one alcohol $R^2$—OH to give the compounds of the general formula (I.1) (step c2)).

Esterification

Conventional processes known to the person skilled in the art can be used to convert the 2,5-furandicarboxylic acid (FDCA) or the 2,5-tetrahydrofurandicarboxylic acid to the corresponding ester compounds of the general formulae (I.1), (I.1a), and (I.1b). Among these are the reaction of at least one alcohol component selected from $C_1$-$C_3$-alkanols or from the alcohols $R^1$—OH and, respectively, $R^2$—OH with FDCA or a suitable derivative thereof. Examples of suitable derivatives are the acyl halides and anhydrides. A preferred acyl halide is the acyl chloride. Esterification catalysts that can be used are the catalysts conventionally used for this purpose, e.g. mineral acids, such as sulfuric acid and phosphoric acid; organic sulfonic acids, such as methanesulfonic acid and p-toluenesulfonic acid; amphoteric catalysts, in particular titanium compounds, tin(IV) compounds, or zirconium compounds, e.g. tetraalkoxytitanium compounds, e.g. tetrabutoxytitanium, and tin(IV) oxide. The water produced during the reaction can be removed by conventional measures, e.g. by distillation. WO 02/38531 describes a process for producing esters of polybasic carboxylic acids where a) a mixture consisting essentially of the acid component or of an anhydride thereof and of the alcohol component is heated to boiling point in the presence of an esterification catalyst in a reaction zone, b) the vapors comprising alcohol and water are fractionated to give an alcohol-rich fraction and a water-rich fraction, c) the alcohol-rich fraction is returned to the reaction zone, and the water-rich fraction is discharged from the process. The process described in WO 02/38531, and also the catalyst disclosed therein, are likewise suitable for the esterification reaction. An effective amount of the esterification catalyst is used and is usually in the range from 0.05 to 10% by weight, preferably from 0.1 to 5% by weight, based on the entirety of acid component (or anhydride) and alcohol component.

Other suitable processes for the production of the compounds of the general formula (I.1) by means of esterification are described by way of example in U.S. Pat. No. 6,310,235, U.S. Pat. No. 5,324,853, DE-A 2612355 or DE-A 1945359. The entirety of the documents mentioned is incorporated herein by way of reference.

In general, the esterification of FDCA or of the 2,5-tetrahydrofurandicarboxylic acid is preferably carried out in the presence of the alcohol components described above by means of an organic acid or mineral acid, in particular concentrated sulfuric acid. The amount used of the alcohol component here is advantageously at least twice the stochiometric amount, based on the amount of FDCA or 2,5-tetrahydrofuran dicarboxylic acid or a suitable derivative thereof in the reaction mixture.

The esterification can generally take place at ambient pressure or at reduced or elevated pressure. It is preferable that the esterification is carried out at ambient pressure or reduced pressure.

The esterification can be carried out in the absence of any added solvent or in the presence of an organic solvent.

If the esterification is carried out in the presence of a solvent, it is preferable that this is an organic solvent that is inert under the reaction conditions. Among these are by way of example aliphatic hydrocarbons, halogenated aliphatic hydrocarbons, and aromatic and substituted aromatic hydrocarbons and ethers. It is preferable that the solvent is one selected from pentane, hexane, heptane, ligroin, petroleum ether, cyclohexane, dichloromethane, trichloromethane, tetrachloromethane, benzene, toluene, xylene, chlorobenzene, dichlorobenzenes, dibutyl ether, THF, dioxane, and mixtures thereof.

The esterification is usually carried out in a temperature range from 50 to 250° C.

If the esterification catalyst is selected from organic acids or mineral acids, the esterification is usually carried out in the temperature range from 50 to 160° C.

If the esterification catalyst is selected from amphoteric catalysts, the esterification is usually carried out in the temperature range from 100 to 250° C.

The esterification can take place in the absence of or in the presence of an inert gas. The expression inert gas generally means a gas which under the prevailing reaction conditions does not enter into any reactions with the starting materials, reagents, or solvents participating in the reaction, or with the resultant products. It is preferable that the esterification takes place without addition of any inert gas.

Transesterification:

Conventional processes known to the person skilled in the art can be used for the transesterification, described in steps b1) and c2), of the di($C_1$-$C_3$-alkyl) 2,5-furandicarboxylates and, respectively, the di($C_1$-$C_3$-alkyl) 2,5-tetrahydrofuran dicarboxylates to give the corresponding ester compounds I.1a and, respectively, I.1. Among these are the reaction of the di($C_1$-$C_3$)-alkyl esters with at least one $C_4$-$C_5$-alkanol or $C_5$-$C_6$-cycloalkanol or a mixture thereof in the presence of a suitable transesterification catalyst.

Transesterification catalysts that can be used are the conventional catalysts usually used for transesterification reactions, where these are mostly also used in esterification reactions. Among these are by way of example mineral acids, such as sulfuric acid and phosphoric acid; organic sulfonic acids, such as methanesulfonic acid and p-toluenesulfonic acid; and specific metal catalysts from the group of the tin(IV) catalysts, for example dialkyltin dicarboxylates, such as dibutyltin diacetate, trialkyltin alkoxides, monoalkyltin compounds, such as monobutyltin dioxide, tin salts, such as tin acetate, or tin oxides; from the group of the titanium catalysts: monomeric and polymeric titanates and titanium chelates, for example tetraethyl orthotitanate, tetrapropyl orthotitanate, tetrabutyl orthotitanate, triethanolamine titanate; from the group of the zirconium catalysts: zirconates and zirconium chelates, for example tetrapropyl zirconate, tetrabutyl zirconate, triethanolamine zirconate; and also lithium catalysts, such as lithium salts, lithium alkoxides; and aluminum(III) acetylacetonate, chromium (III) acetylacetonate, iron(III) acetylacetonate, cobalt(II) acetylacetonate, nickel(II) acetylacetonate, and zinc(II) acetylacetonate.

The amount of transesterification catalyst used is from 0.05 to 5% by weight, preferably from 0.1 to 1% by weight. The reaction mixture is preferably heated to the boiling point of the reaction mixture, the reaction temperature therefore being from 20° C. to 200° C., depending on the reactants.

The transesterification can take place at ambient pressure or at reduced or elevated pressure. It is preferable that the transesterification is carried out at a pressure of from 0.001 to 200 bar, particularly from 0.01 to 5 bar. The relatively low-boiling-point alcohol eliminated during the transesterification is preferably continuously removed by distillation in order to shift the equilibrium of the transesterification reaction. The distillation column necessary for this purpose generally has direct connection to the transesterification reactor, and it is preferable that said column is a direct attachment thereto. If a plurality of transesterification reactors are used in series, each of said reactors can have a distillation column, or the vaporized alcohol mixture can preferably be introduced into a distillation column from the final tanks of the transesterification reactor cascade by way of one or more collection lines. The relatively high-boiling-point alcohol reclaimed in said distillation is preferably returned to the transesterification.

If an amphoteric catalyst is used, this is generally removed via hydrolysis and subsequent removal of the resultant metal oxide, e.g. via filtration. It is preferable that, after reaction has been completed, the catalyst is hydrolyzed by means of washing with water, and the precipitated metal oxide is removed by filtration. The filtrate can, if desired, be subjected to further work-up for the isolation and/or purification of the product. It is preferable that the product is isolated by distillation.

In steps 1b) and 2c), the transesterification of the di($C_1$-$C_3$-alkyl) 2,5-furandicarboxylates and, respectively, di($C_1$-$C_3$-alkyl) 2,5-tetrahydrofurandicarboxylates preferably takes place in the presence of the alcohol component and in the presence of at least one titanium(IV) alcoholate. Preferred titanium(IV) alcoholates are tetrapropoxytitanium, tetrabutoxytitanium, and mixtures thereof. It is preferable that the amount used of the alcohol component is at least twice the stochiometric amount, based on the di($C_1$-$C_3$-alkyl) ester used.

The transesterification can be carried out in the absence of, or in the presence of, an added organic solvent. It is preferable that the transesterification is carried out in the presence of an inert organic solvent. Suitable organic solvents are those mentioned above for the esterification. Among these are specifically toluene and THF.

The transesterification is preferably carried out in the temperature range from 50 to 200° C.

The transesterification can take place in the absence of or in the presence of an inert gas. The expression inert gas generally means a gas which under the prevailing reaction conditions does not enter into any reactions with the starting materials, reagents, or solvents participating in the reaction, or with the resultant products. It is preferable that the transesterification takes place without addition of any inert gas.

Hydrogenation

Many processes and catalysts for the hydrogenation of the double bonds of the furan ring carried out in steps c1) and b2) are available to the person skilled in the art and these by way of example are also used in the hydrogenation of esters of aromatic polycarboxylic acids, examples being phthalates, isophthalates and terephthalates. By way of example, the ring-hydrogenation process described in WO 99/032427 is suitable. This comprises hydrogenation at from 50 to 250° C. and at a pressure of from 20 to 300 bar by means of catalysts which comprise at least one metal of transition group VIII of the Periodic Table of the Elements, for example platinum, rhodium, palladium, cobalt, nickel, or ruthenium, preferably ruthenium, either alone or together with at least one metal from transition group I or VII of the Periodic Table of the Elements, for example copper or rhenium, deposited on a mesoporous aluminum oxide support material with bimodal pore distribution. The ring-hydrogenation process described in WO 02/100536 is moreover suitable. This comprises hydrogenation with use of a ruthenium catalyst on amorphous silicon dioxide as support. Other suitable processes are described in the following documents: EP-A 1266882—Use of a nickel/magnesium oxide on kieselguhr catalyst, WO 03/029181—Use of a nickel/zinc on silicon dioxide catalyst, WO 03/029168—Use of a palladium/ZnO on $Al_2O_3$ catalyst and of a ruthenium/ZnO on $\alpha$-$Al_2O_3$ catalyst, or WO 04/09526—Use of a ruthenium on titanium dioxide catalyst. Other suitable catalysts are likewise Raney catalysts, preferably Raney nickel. Other suitable support materials alongside those already mentioned are by way of example zirconium dioxide ($ZrO_2$), sulfated zirconium dioxide, tungsten carbide (WC), titanium dioxide ($TiO_2$), sulfated carbon, activated charcoal, aluminum phosphate, aluminosilicates, or phosphated aluminum oxide, or else a combination thereof.

The hydrogenation can take place by analogy with the known hydrogenation processes for hydrogenating organic compounds which have hydrogenatable groups. To this end, the organic compound in the form of liquid phase or gas phase, preferably in the form of liquid phase, is brought into contact with the catalyst in the presence of hydrogen. The liquid phase can by way of example be passed over a fluidized bed of catalyst (fluidized bed method) or can be passed over a fixed bed of catalyst (fixed bed method).

In general, it is preferable that the hydrogenation takes place in a fixed-bed reactor.

The hydrogenation can be designed to take place either continuously or else batchwise, preference being given here to the continuous design of the process. The batchwise hydrogenation can use a reaction apparatus conventionally used for this purpose, e.g. a stirred reactor. It is preferable that the hydrogenation is carried out continuously in fixed-bed reactors in liquid-phase or trickle mode. The hydrogen here can be passed over the catalyst cocurrently with the solution of the starting material to be hydrogenated, or else in countercurrent.

Suitable apparatuses for conducting fluidized-bed-catalyst hydrogenation and fixed-bed-catalyst hydrogenation are known in the prior art, e.g. from Ullmanns Enzyklopädie der Technischen Chemie [Ullmann's Encyclopedia of Industrial Chemistry], 4$^{th}$ edition, volume 13, pp. 135 ff., and also from P. N. Rylander, "Hydrogenation and Dehydrogenation" in Ullmann's Encyclopedia of Industrial Chemistry, 5th edn. on CD-ROM.

The hydrogenation generally takes place under elevated hydrogen pressure. Preference is given to hydrogen pressure in the range from 2 to 500 bar, particularly from 10 to 300 bar.

It is preferable that the hydrogenation takes place in the presence of an organic solvent that is inert under the hydrogenation conditions. Suitable solvents are those previously defined for the esterification. Specifically, an ether is used, for example THF, or a dialkylene glycol, or a mono- or diether thereof, for example glyme.

The hydrogenation is carried out at a temperature in the range from 20 to 350° C., particularly preferably from 50 to 300° C.

The amount of hydrogen used for the hydrogenation is generally from 1 to 15 times the stochiometric amount of hydrogen theoretically needed for the complete hydrogenation of the furan ring.

In one preferred embodiment of steps c1) and b2), the hydrogenation of the furan ring is carried out with platinum, rhodium, palladium, cobalt, nickel, or ruthenium, in particular platinum and palladium, deposited on aluminum oxide, on zirconium dioxide, on sulfated zirconium dioxide, on zinc oxide, or on silicon dioxide, in particular on zirconium dioxide, in the presence of an inert solvent, under hydrogen pressure of from 150 to 300 bar, at a temperature of from 150 to 250° C.

The hydrogenation processes described can give preference to formation of the cis- or trans-isomer of the 2,5-tetrahydrofurandicarboxylic esters in accordance with the selected hydrogenation conditions, or hydrogenation temperature: it is possible to produce cis- or trans-2,5-tetrahydrofurandicarboxylic esters that are in essence isomerically pure, or else a mixture with various proportions of cis- and trans-isomers. The expression "in essence isomerically pure" here means content of at least 95% by weight of a particular isomer, based on the total weight of the 2,5-tetrahydrofurandicarboxylic ester.

The compounds of the general formula (I.1) can accordingly take the form of pure cis-isomers or take the form of pure trans-isomers, or take the form of cis/trans-isomer mixtures. The pure isomers and the isomer mixtures of any desired composition are equally suitable as rapid-gelling agents.

In one particularly preferred embodiment of method steps c1) and b2), FDCA and, respectively, the esters of the 2,5-furandicarboxylic acid from steps a) and b1) are dissolved in an inert solvent and fully hydrogenated in the presence of a heterogeneous Pd/Pt catalyst at a hydrogen pressure of from 50 to 300 bar and at from 100 to 250° C. The hydrogenation here takes place continuously by the fixed-bed method, where the hydrogen is conducted in countercurrent over the catalyst. It is preferable to use THF as solvent, and to use a Pd/Pt catalyst on $ZrO_2$. The reaction temperature is in the range from 100 to 200° C. In this embodiment, the desired tetrahydrofuran derivatives are generally obtained with a proportion of cis-isomer of at least 90% by weight, based on the total amount of the cis/trans-isomers formed.

One particularly suitable embodiment of the process comprises:
a) reaction of 2,5-furandicarboxylic acid with methanol in the presence of concentrated sulfuric acid to give dimethyl 2,5-furandicarboxylate,
2b) hydrogenation of the dimethyl 2,5-furandicarboxylate obtained in step a) with hydrogen in the presence of a Pd/Pt catalyst on $ZrO_2$ to give dimethyl 2,5-tetrahydrofurandicarboxylate,
2c) reaction of the dimethyl 2,5-tetrahydrofurandicarboxylate obtained in step 2b) with at least one alcohol $R^1$—OH in the presence of at least one titanium(IV) alcoholate to give the compounds of the general formula (I.1).

Production of the $C_4$-$C_6$-diether derivatives and, respectively, $C_4$-$C_6$-diester derivatives of the formulae (I.2) and, respectively, (I.3)

Compounds of the general formula (I.2) or (I.3),

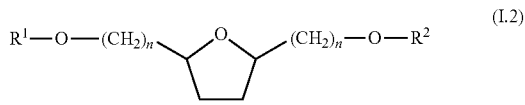

(I.2)

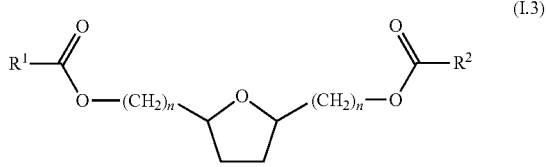

(I.3)

in which one of the abovementioned definitions applies to $R^1$ and $R^2$, and n has the value 1 or 2, are obtainable via a process where
a) 2,5-di(hydroxymethyl)tetrahydrofuran (n=1) or 2,5-Di (hydroxyethyl)tetra-hydrofuran (n=2) is reacted with at least one alkylating reagent $R^1$—Z and, if $R^1$ differs from $R^2$, also with at least one alkylating reagent $R^2$—Z, where Z is a leaving group, in the presence of a base to give compounds of the formula (I.2), or b) 2,5-di(hydroxymethyl)tetrahydrofuran (n=1) or 2,5-di(hydroxyethyl)-tetra-hydrofuran (n=2) is reacted with at least one acyl halide $R^1$—(C=O)X and, if $R^1$ differs from $R^2$, also with at least one acyl halide $R^2$—(C=O)X, where X is Br or Cl, in the presence of at least one tertiary amine compound of the formula (I.3).

The alkylation is generally carried out in the presence of an organic solvent that is inert under the reaction conditions. Suitable solvents are those previously mentioned for the esterification. Aromatic hydrocarbons, such as toluene, are preferred as solvent.

The leaving group Z is preferably a moiety selected from Br, Cl, and the tosyl, mesyl, and triflyl group.

It is particularly preferable that the leaving group Z is Br.

The alkylation reagents $R^1$—Z and $R^2$—Z can be purchased from commercial sources or can be produced by way of suitable reactions or procedures familiar to the person skilled in the art, from the corresponding alcohols. By way of example, the alkyl bromides $R^1$—Br and, respectively, $R^2$—Br preferably used for this process can be produced in a known manner on a large industrial scale from the appropriate alcohols $R^1$—OH and, respectively, $R^2$—OH by using hydrogen bromide (HBr).

Suitable bases that can be used are mineral bases and/or strong organic bases. Among these are by way of example inorganic bases or base-formers, for example hydroxides, hydrides, amides, oxides, and carbonates of the alkali metals and of the alkaline earth metals. Among these are LiOH, NaOH, KOH, $Mg(OH)_2$, $Ca(OH)_2$, LiH, NaH, sodium amide ($NaNH_2$), lithium diisopropylamide (LDA), $Na_2O$, $K_2CO_3$, $Na_2CO_3$ and $Cs_2CO_3$; and also organometallic compounds, such as n-BuLi, or tert-BuLi. Preference is given to NaOH, KOH, $K_2CO_3$, and $Na_2CO_3$.

The amount used here of the base is preferably at least a two-fold stoichiometric excess, based on the 2,5-di(hydroxymethyl)tetrahydrofuran and, respectively, 2,5-di(hydroxyethyl)tetrahydrofuran. It is particularly preferable to use an at least four-fold stoichiometric excess of base.

The alkylation can be carried out in the absence of, or in the presence of, an organic solvent. The reaction is generally carried out in the presence of an inert organic solvent, such as pentane, hexane, heptane, ligroin, petroleum ether, cyclohexane, dichloromethane, trichloromethane, tetrachloromethane, benzene, toluene, xylene, chlorobenzene, dichlorobenzenes, dibutyl ether, THF, dioxane, or a mixture thereof.

The alkylation can generally take place at ambient pressure, reduced pressure, or elevated pressure. It is preferable that the alkylation is carried out at ambient pressure.

It is preferable that the alkylation is carried out in the temperature range from 30 to 200° C., preferably from 50 to 150° C.

The alkylation can take place in the absence of, or in the presence of, an inert gas. It is preferable that the alkylation uses no inert gas.

In one specific suitable embodiment of the alkylation, 2,5-di(hydroxymethyl)-tetrahydrofuran or 2,5-di(hydroxyethyl)tetrahydrofuran is converted to the diether compounds of the general formula (I.2) in the presence of an at least four-fold excess of base in an inert organic solvent and with at least one alkyl bromide $R^1$—Br and, respectively, $R^2$—Br. In relation to the moieties $R^1$ and $R^2$, reference is made to the previous descriptions. As base, it is preferable to use an alkali metal hydroxide, in particular KOH.

To produce the ester compounds of the general formula (I.3), it is preferable to react 2,5-di(hydroxymethyl)tetrahydrofuran or 2,5-di(hydroxyethyl)tetrahydrofuran with at least one acyl halide $R^1$—(C=O)X and, if $R^1$ and $R^2$ are different, with at least one acyl halide $R^2$—(C=O)X, where X is Br or Cl, in the presence of at least one tertiary amine, to give the compounds of the formula (I.3).

There are also other familiar esterification methods, alongside this process, available to the person skilled in the art, as previously described in relation to the esterification of FDCA and, respectively, 2,5-tetrahydrofurandicarboxylic acid.

The ester compounds of the general formula (I.3) can usually be produced by using any of the tertiary amines familiar to the person skilled in the art. Examples of suitable tertiary amines are:

from the group of the trialkylamines: trimethylamine, triethylamine, tri-n-propylamine, diethylisopropylamine, diisopropylethylamine and the like;

from the group of the N-cycloalkyl-N,N-dialkylamines: dimethylcyclohexylamine and diethylcyclohexylamine;

from the group of the N,N-dialkylanilines: dimethylaniline and diethylaniline;

from the group of the pyridine and quinoline bases: pyridine, α-, β-, and γ-picoline, quinoline and 4-(dimethylamino)pyridine (DMAP).

Preferred tertiary amines are trialkylamines and pyridine bases, in particular triethylamine and 4-(dimethylamino)pyridine (DMAP), and also mixtures thereof.

The esterification can take place at ambient pressure, or at reduced or elevated pressure. It is preferable to carry out the esterification at ambient pressure.

The esterification can be carried out in the absence of, or in the presence of, an organic solvent. It is preferable to carry out the esterification in the presence of an inert organic solvent, as defined previously.

The esterification is usually carried out in the temperature range from 50 to 200° C.

The esterification can take place in the absence of, or in the presence of, an inert gas.

In one preferred embodiment of the process for the production of the compounds 1.3, 2,5-di(hydroxymethyl)tetrahydrofuran is reacted with an acyl chloride $R^1$—(C=O)Cl in the presence of triethylamine and/or DMAP and of an inert organic solvent to give compounds of the formula (I.3).

$C_4$-$C_5$-Alkanols and $C_5$-$C_6$-cycloalkanols are used as starting materials for the production of the compounds of the general formula (I).

Preferred $C_4$-$C_5$-alkanols can be straight-chain or branched compounds, or can be composed of mixtures of straight-chain and branched butanols and, respectively, pentanols. Among these are 1-butanol, 2-butanol, 2-methyl-1-propanol, 2-methyl-2-propanol, 1-pentanol, and 2-methylbutanol, and also mixtures thereof. Preference is given to 1-butanol, 2-methyl-1-propanol, and 1-pentanol.

The $C_5$-$C_6$-cycloalkanols are those selected from cyclopentanol and cyclohexanol, and mixtures thereof. Preference is given to cyclohexanol.

Substituted $C_5$-$C_6$-cycloalkanols can, as permitted by their ring size, have one or more (e.g. 1, 2, 3, 4, or 5) $C_1$-$C_{10}$-alkyl substituents. Examples of $C_5$-$C_6$-cycloalkanols are 2- and 3-methylcyclopentanol, 2-, and 3-ethylcyclopentanol, 2-, 3-, and 4-methyl-cyclohexanol, 2-, 3-, and 4-ethylcyclohexanol, 2-, 3-, and 4-Propylcyclohexanol, 2-, 3-, and 4-isopropylcyclohexanol, 2-, 3-, and 4-butylcyclohexanol, 2-, 3-, and 4-sec-butylcyclohexanol, and 2-, 3-, and 4-tert-butylcyclohexanol.

The furan-2,5-dicarboxylic acid (FDCA, CAS No. 3238-40-2) used for producing compounds of the general formula (I) can either be purchased commercially or can be produced by synthesis routes known from the literature: possibilities for synthesis are found in the publication by Lewkowski et al. published on the Internet with the title "Synthesis, Chemistry and Application of 5-hydroxymethylfurfural and its derivatives" (Lewkowski et al, ARKIVOC 2001 (i), pp. 17-54, ISSN 1424-6376). A feature common to most of these syntheses is acid-catalyzed reaction of carbohydrates, particularly glucose and fructose, preferably fructose, to give 5-hydroxymethylfurfural (5-HMF), which can be separated from the reaction mixture by using technical processes such as a two-phase method. Appropriate results have been described by way of example by Leshkov et al. in Science 2006, vol. 312, pp. 1933-1937, and by Zhang et al. in Angewandte Chemie 2008, vol. 120, pp. 9485-9488. 5-HMF can then be oxidized to FDCA in a further step, as cited by way of example by Christensen in ChemSusChem 2007, vol. 1, pp. 75-78.

2,5-bis(hydroxymethyl)tetrahydrofuran (CAS No. 104-80-3) can likewise either be purchased or can be synthesized. The syntheses described start from 5-HMF, which can be reduced in two steps by way of 2,5-bis(hydroxymethyl)furan (2,5-BHF) or directly to give 2,5-di(hydroxymethyl)tetrahydrofuran (Lewkowski et al., ARKIVOC 2001 (i), pp. 17-54, ISSN 1424-6376).

2,5-bis(hydroxyethyl)tetrahydrofuran can be obtained via reduction of methyl 2,5-furandiacetate. Methyl 2,5-furandiacetate can be synthesized by way of suitable reactions familiar to the person skilled in the art from 2,5-bis(hydroxymethyl)furan (2,5-BHF), for example by analogy with the process described by Rau et al. in Liebigs Ann. Chem., vol. 1984 (8. 1984), pp. 1504-1512, ISSN 0947-3440. Here, 2,5-bis(chloromethyl)furan is prepared from 2,5-BHF via reaction with thionyl chloride, and is reacted via exposure to KCN in benzene in the presence of [18]-crown-6 to give 2,5-bis(cyanomethyl)furan. 2,5-bis(cyanomethyl)furan can then be hydrolyzed to give 2,5-furandiacetic acid and esterified with methanol to give the dimethyl ester, or can be converted directly to methyl 2,5-furandiacetate via alcoholysis with methanol (Pinner reaction). Methyl 2,5-furandiacetate can then either be first hydrogenated to dimethyl tetrahydro-2,5-furandiacetate (by analogy with steps b2) and, respectively, c1)) or can be reduced directly to 2,5-bis(hydroxyethyl)tetrahydrofuran.

Methyl 2,5-furandiacetate can likewise be prepared by analogy with the process described by Kern et al in Liebigs Ann. Chem., vol. 1985 (6. 1985), pp. 1168-1174, ISSN 0947-3440.

Compounds of the General Formula (II)

The compounds of the general formula (II) can either be purchased or produced by processes known in the prior art.

The 1,2-cyclohexanedicarboxylic esters are generally obtained mostly via ring-hydrogenation of the corresponding phthalic esters. The ring-hydrogenation can take place as mentioned above by the process described in WO 99/32427. A particularly suitable ring-hydrogenation process is also described by way of example in WO 2011082991 A2.

1,2-Cyclohexanedicarboxylic esters can moreover be obtained via esterification of 1,2-cyclohexanedicarboxylic acid or of suitable derivatives thereof with the corresponding alcohols. The esterification can take place by conventional processes known to the person skilled in the art.

A feature common to the processes for the production of the compounds of the general formula (II) is that, starting from phthalic acid, 1,2-cyclohexanedicarboxylic acid, or suitable derivatives thereof, an esterification or transesterification reaction is carried out, where the corresponding $C_7$-$C_{12}$-alkanols are used as starting materials. These alcohols are generally not pure substances, instead being isomer mixtures of which the composition and purity depends on the particular process by which they are prepared.

Preferred $C_7$-$C_{12}$-alkanols which are used for the production of the compounds (II) comprised in the plasticizer composition of the invention can be straight-chain or branched, or can be composed of mixtures of straight-chain and branched $C_7$-$C_{12}$-alkanols. Among these are n-heptanol, isoheptanol, n-octanol, isooctanol, 2-ethylhexanol, n-nonanol, isononanol, isodecanol, 2-propylheptanol, n-undecanol, isoundecanol, n-dodecanol, and isododecanol. Particularly preferred $C_7$-$C_{12}$-alkanols are 2-ethylhexanol, isononanol, and 2-propylheptanol, in particular isononanol.

Heptanol

The heptanols used for the production of the compounds of the general formula (II) can be straight-chain or branched or can be composed of mixtures of straight-chain and branched heptanols. It is preferable to use mixtures of branched heptanols, also known as isoheptanol, which are produced via rhodium- or preferably cobalt-catalyzed hydroformylation of propene dimer, obtainable by way of example by the Dimersol® process, and subsequent hydrogenation of the resultant isoheptanals to give an isoheptanol mixture. Because of the process used for its production, the resultant isoheptanol mixture is composed of a plurality of isomers. Substantially straight-chain heptanols can be obtained via rhodium- or preferably cobalt-catalyzed hydroformylation of 1-hexene and subsequent hydrogenation of the resultant n-heptanal to give n-heptanol. The hydroformylation of 1-hexene or of propene dimer can be achieved by methods known per se: compounds used as catalyst in hydroformylation with rhodium catalysts homogeneously dissolved in the reaction medium can be not only uncomplexed rhodium carbonyl compounds which are formed in situ under the conditions of the hydroformylation reaction within the hydroformylation reaction mixture on exposure to synthesis gas, e.g. from rhodium salts, but also complex rhodium carbonyl compounds, in particular complexes with organic phosphines, such as triphenylphosphine, or with organophosphites, preferably chelating biphosphites, as described by way of example in U.S. Pat. No. 5,288,918. Compounds used in the cobalt-catalyzed hydroformylation of these olefins are generally cobalt carbonyl compounds which are homogeneously soluble in the reaction mixture and which are formed in situ from cobalt salts under the conditions of the hydroformylation reaction on exposure to synthesis gas. If the cobalt-catalyzed hydroformylation is carried out in the presence of trialkyl- or triarylphosphines, the desired heptanols are formed directly as hydroformylation product, and there is therefore then no need for further hydrogenation of the aldehyde function.

Examples of suitable processes for the cobalt-catalyzed hydroformylation of 1-hexene or of the hexene isomer mixtures are the established industrial processes explained on pages 162-168 of Falbe, New Syntheses with Carbon Monoxide, Springer, Berlin, 1980, an example being the Ruhrchemie process, the BASF process, the Kuhlmann process, or the Shell process. Whereas the Ruhrchemie, BASF, and Kuhlmann process operate with non-ligand-modified cobalt carbonyl compounds as catalysts and thus give hexanal mixtures, the Shell process (DE-A 1593368) uses, as catalyst, phosphine- or phosphite-ligand-modified cobalt carbonyl compounds which lead directly to the hexanol mixtures because they also have high hydrogenation activity. DE-A 2139630, DE-A 2244373, DE-A 2404855, and WO 01014297 provide detailed descriptions of advantageous embodiments for the conduct of the hydroformylation with non-ligand-modified cobalt carbonyl complexes.

The rhodium-catalyzed hydroformylation of 1-hexene or of the hexene isomer mixtures can use the established industrial low-pressure rhodium hydroformylation process with triphenylphosphine-ligand-modified rhodium carbonyl compounds, which is subject matter of U.S. Pat. No. 4,148,830. Non-ligand-modified rhodium carbonyl compounds can serve advantageously as catalyst for the rhodium-catalyzed hydroformylation of long-chain olefins, for example of the hexene isomer mixtures obtained by the processes described above; this differs from the low-pressure process in requiring a higher pressure of from 80 to 400 bar. The conduct of high-pressure rhodium hydroformylation processes of this type is described by way of example in EP-A 695734, EP-B 880494, and EP-B 1047655.

The isoheptanal mixtures obtained after hydroformylation of the hexene isomer mixtures are catalytically hydrogenated in a manner that is per se conventional to give isoheptanol mixtures. For this purpose it is preferable to use heterogeneous catalysts which comprise, as catalytically active component, metals and/or metal oxides of groups VI to VIII, or else of transition group I, of the Periodic Table of the Elements, in particular chromium, molybdenum, manganese, rhenium, iron, cobalt, nickel, and/or copper, optionally deposited on a support material, such as $Al_2O_3$, $SiO_2$ and/or $TiO_2$. Catalysts of this type are described by way of example in DE-A 3228881, DE-A 2628987, and DE-A 2445303. It is particularly advantageous to carry out the hydrogenation of the isoheptanals with an excess of hydrogen of from 1.5 to 20% above the stoichiometric amount of hydrogen needed for the hydrogenation of the isoheptanals, at temperatures of from 50 to 200° C., and at a hydrogen pressure of from 25 to 350 bar, and for avoidance of side-reactions to add, during the course of the hydrogenation, in accordance with DE-A 2628987, a small amount of water, advantageously in the form of an aqueous solution of an alkali metal hydroxide or alkali metal carbonate, in accordance with the teaching of WO 01087809.

Octanol

For many years, 2-ethylhexanol was the largest-production-quantity plasticizer alcohol, and it can be obtained through the aldol condensation of n-butyraldehyde to give 2-ethylhexanal and subsequent hydrogenation thereof to give 2-ethylhexanol (see Ullmann's Encyclopedia of Industrial Chemistry; $5^{th}$ edition, vol. A 10, pp. 137-140, VCH Verlagsgesellschaft GmbH, Weinheim 1987).

Substantially straight-chain octanols can be obtained via rhodium- or preferably cobalt-catalyzed hydroformylation of 1-heptene and subsequent hydrogenation of the resultant n-octanal to give n-octanol. The 1-heptene needed for this purpose can be obtained from the Fischer-Tropsch synthesis of hydrocarbons.

By virtue of the production route used for the alcohol isooctanol, it is not a unitary chemical compound, in contrast to 2-ethylhexanol or n-octanol, but instead is an isomer mixture of variously branched $C_8$-alcohols, for example of 2,3-dimethyl-1-hexanol, 3,5-dimethyl-1-hexanol, 4,5-dimethyl-1-hexanol, 3-methyl-1-heptanol, and 5-methyl-1-heptanol; these can be present in the isooctanol in various quantitative proportions which depend on the production conditions and production processes used. Isooctanol is usually produced via codimerization of propene with butenes, preferably n-butenes, and subsequent hydroformylation of the resultant mixture of heptene isomers. The octanal isomer mixture obtained in the hydroformylation can subsequently be hydrogenated to give the isooctanol in a manner that is conventional per se.

The codimerization of propene with butenes to give isomeric heptenes can advantageously be achieved with the aid of the homogeneously catalyzed Dimersol® process (Chauvin et al; Chem. Ind.; May 1974, pp. 375-378), which uses, as catalyst, a soluble nickel phosphine complex in the presence of an ethylaluminum chlorine compound, for example ethylaluminum dichloride. Examples of phosphine ligands that can be used for the nickel complex catalyst are tributylphosphine, triisopropyl-phosphine, tricyclohexylphosphine, and/or tribenzylphosphine. The reaction takes place at temperatures of from 0 to 80° C., and it is advantageous here to set a pressure at which the olefins are present in solution in the liquid reaction mixture (Cornils; Hermann: Applied Homogeneous Catalysis with Organometallic Compounds; $2^{nd}$ edition, vol. 1; pp. 254-259, Wiley-VCH, Weinheim 2002).

In an alternative to the Dimersol® process operated with nickel catalysts homogeneously dissolved in the reaction medium, the codimerization of propene with butenes can also be carried out with a heterogeneous NiO catalyst deposited on a support; heptene isomer distributions obtained here are similar to those obtained in the homogeneously catalyzed process. Catalysts of this type are by way of example used in what is known as the Octol® process (Hydrocarbon Processing, February 1986, pp. 31-33), and a specific heterogeneous nickel catalyst with good suitability for olefin dimerization or olefin codimerization is disclosed by way of example in WO 9514647. Codimerization of propene with butenes can also use, instead of nickel-based catalysts, heterogeneous Brønsted-acid catalysts; heptenes obtained here are generally more highly branched than in the nickel-catalyzed processes. Examples of catalysts suitable for this purpose are solid phosphoric acid catalysts, e.g. phosphoric-acid-impregnated kieselguhr or diatomaceous earth, these being as utilized in the PolyGas® process for olefin dimerization or olefin oligomerization (Chitnis et al; Hydrocarbon Engineering 10, No. 6-June 2005). Brønsted-acid catalysts that have very good suitability for the codimerization of propene and butenes to give heptenes are zeolites, which are used in the EMOGAS® process, a further development based on the PolyGas® process.

The 1-heptene and the heptene isomer mixtures are converted to n-octanal and, respectively, octanal isomer mixtures by the known processes explained above in connection with the production of n-heptanal and heptanal isomer mixtures, by means of rhodium- or cobalt-catalyzed hydroformylation, preferably cobalt-catalyzed hydro-formylation. These are then hydrogenated to give the corresponding octanols, for example by means of one of the catalysts mentioned above in connection with production of n-heptanol and of isoheptanol.

Nonanol

Substantially straight-chain nonanol can be obtained via rhodium- or preferably cobalt-catalyzed hydroformylation of 1-octene and subsequent hydrogenation of the resultant n-nonanal. The starting olefin 1-octene can be obtained by way of example by way of ethylene oligomerization by means of a nickel complex catalyst that is homogenously soluble in the reaction medium—1,4-butanediol—with, for example, diphenyl-phosphinoacetic acid or 2-diphenylphosphinobenzoic acid as ligand. This process is also known as the Shell Higher Olefins Process or SHOP process (see Weisermel, Arpe: Industrielle Organische Chemie [Industrial organic chemistry]; 5$^{th}$ edition, p. 96; Wiley-VCH, Weinheim 1998).

Isononanol used for the synthesis of the diisononyl esters of general formula (II) comprised in the plasticizer composition of the invention is not a unitary chemical compound, but instead is a mixture of variously branched, isomeric $C_9$-alcohols which can have various degrees of branching depending on the manner in which they were produced, and also in particular on the starting materials used. The isononanols are generally produced via dimerization of butenes to give isooctene mixtures, subsequent hydroformylation of the isooctene mixtures, and hydrogenation of the resultant isononanal mixtures to give isononanol mixtures, as explained in Ullmann's Encyclopedia of Industrial Chemistry, 5$^{th}$ edition, vol. A1, pp. 291-292, VCH Verlagsgesellschaft GmbH, Weinheim 1995.

Isobutene, cis- and trans-2-butene, and also 1-butene, or a mixture of these butene isomers, can be used as starting material for the production of the isononanols. The dimerization of pure isobutene, mainly catalyzed by means of liquid Brønsted acids, e.g. sulfuric acid or phosphoric acid, or by means of solid Brønsted acids, e.g. phosphoric acid applied to kieselguhr, $SiO_2$, or $Al_2O_3$, as support material, or zeolites, mainly gives the highly branched compound 2,4,4-trimethylpentene, also termed diisobutylene, which gives highly branched isononanols after hydroformylation and hydrogenation of the aldehyde.

Preference is given to isononanols with a low degree of branching. Isononanol mixtures of this type with little branching are prepared from the linear butenes 1-butene, cis- and/or trans-2-butene, which optionally can also comprise relatively small amounts of isobutene, by way of the route described above involving butene dimerization, hydroformylation of the isooctene, and hydrogenation of the resultant isononanal mixtures. A preferred raw material is what is known as raffinate II, which is obtained from the $C_4$-cut of a cracker, for example of a steam cracker, after elimination of allenes, acetylenes, and dienes, in particular 1,3-butadiene, via partial hydrogenation thereof to give linear butenes, or removal thereof via extractive distillation, for example by means of N-methylpyrrolidone, and subsequent Brønsted-acid catalyzed removal of the isobutene comprised therein via reaction thereof with methanol or isobutanol by established large-scale-industrial processes with formation of the fuel additive methyl tert-butyl ether (MTBE), or of the isobutyl tert-butyl ether that is used to obtain pure isobutene.

Raffinate II also comprises, alongside 1-butene and cis- and trans-2-butene, n- and isobutane, and residual amounts of up to 5% by weight of isobutene.

The dimerization of the linear butenes or of the butene mixture comprised in raffinate II can be carried out by means of the familiar processes used on a large industrial scale, for example those explained above in connection with the production of isoheptene mixtures, for example by means of heterogeneous, Brønsted-acid catalysts such as those used in the PolyGas® process or EMOGAS® process, by means of the Dimersol® process with use of nickel complex catalysts homogeneously dissolved in the reaction medium, or by means of heterogeneous, nickel(II)-oxide-containing catalysts by the Octol® process or by the process of WO 9514647. The resultant isooctene mixtures are converted to isononanal mixtures by the known processes explained above in connection with the production of heptanal isomer mixtures, by means of rhodium or cobalt-catalyzed hydroformylation, preferably cobalt-catalyzed hydroformylation.

These are then hydrogenated to give the suitable isononanol mixtures, for example by means of one of the catalysts mentioned above in connection with the production of isoheptanol.

The resultant isononanol isomer mixtures can be characterized by way of their iso-index, which can be calculated from the degree of branching of the individual, isomeric isononanol components in the isononanol mixture multiplied by the percentage proportion of these in the isononanol mixture: by way of example, n-nonanol contributes the value 0 to the iso-index of an isononanol mixture, methyloctanols (single branching) contribute the value 1, and dimethylheptanols (double branching) contribute the value 2. The higher the linearity, the lower is the iso-index of the relevant isononanol mixture. Accordingly, the iso-index of an isononanol mixture can be determined via gas-chromatographic separation of the isononanol mixture into its individual isomers and attendant quantification of the percentage quantitative proportion of these in the isononanol mixture, determined by standard methods of gas-chromatographic analysis. In order to increase the volatility of the isomeric nonanols and improve the gas-chromatographic separation of these, they are advantageously trimethylsilylated by means of standard methods, for example via reaction with N-methyl-N-trimethylsilyltrifluoracetamide, prior to gas-chromatographic analysis. In order to achieve maximum quality of separation of the individual components during gas-chromatographic analysis, it is preferable to use capillary columns with polydimethylsiloxane as stationary phase. Capillary columns of this type are obtainable commercially, and a little routine experimentation by the person skilled in the art is all that is needed in order to select, from the many different products available commercially, one that has ideal suitability for this separation task.

The diisononyl esters of the general formula (II) used in the plasticizer composition of the invention have generally been esterified with isononanols with an iso index of from 0.8 to 2, preferably from 1.0 to 1.8, and particularly preferably from 1.1 to 1.5, which can be produced by the abovementioned processes.

Possible compositions of isononanol mixtures that can be used for the production of the compounds of the general formula (II) of the invention are stated below merely by way of example, and it should be noted here that the proportions of the isomers individually listed within the isononanol mixture can vary, depending on the composition of starting material, for example raffinate II, the composition of butenes in which can vary with the production process, and on variations in the production conditions used, for example the age of the catalysts utilized, and conditions of temperature and of pressure, which have to be adjusted appropriately thereto.

By way of example, an isononanol mixture produced via cobalt-catalyzed hydroformylation and subsequent hydrogenation from an isooctene mixture produced with use of raffinate II as raw material by means of the catalyst and process in accordance with WO 9514647 can have the following composition:

from 1.73 to 3.73% by weight, preferably from 1.93 to 3.53% by weight, particularly preferably from 2.23 to 3.23% by weight of 3-ethyl-6-methyl-hexanol;

from 0.38 to 1.38% by weight, preferably from 0.48 to 1.28% by weight, particularly preferably from 0.58 to 1.18% by weight of 2,6-dimethylheptanol;

from 2.78 to 4.78% by weight, preferably from 2.98 to 4.58% by weight, particularly preferably from 3.28 to 4.28% by weight of 3,5-dimethylheptanol;

from 6.30 to 16.30% by weight, preferably from 7.30 to 15.30% by weight, particularly preferably from 8.30 to 14.30% by weight of 3,6-dimethylheptanol;

from 5.74 to 11.74% by weight, preferably from 6.24 to 11.24% by weight, particularly preferably from 6.74 to 10.74% by weight of 4,6-dimethylheptanol;

from 1.64 to 3.64% by weight, preferably from 1.84 to 3.44% by weight, particularly preferably from 2.14 to 3.14% by weight of 3,4,5-trimethylhexanol;

from 1.47 to 5.47% by weight, preferably from 1.97 to 4.97% by weight, particularly preferably from 2.47 to 4.47% by weight of 3,4,5-trimethylhexanol, 3-methyl-4-ethylhexanol and 3-ethyl-4-methylhexanol;

from 4.00 to 10.00% by weight, preferably from 4.50 to 9.50% by weight, particularly preferably from 5.00 to 9.00% by weight of 3,4-dimethylheptanol;

from 0.99 to 2.99% by weight, preferably from 1.19 to 2.79% by weight, particularly preferably from 1.49 to 2.49% by weight of 4-ethyl-5-methylhexanol and 3-ethylheptanol;

from 2.45 to 8.45% by weight, preferably from 2.95 to 7.95% by weight, particularly preferably from 3.45 to 7.45% by weight of 4,5-dimethylheptanol and 3-methyloctanol;

from 1.21 to 5.21% by weight, preferably from 1.71 to 4.71% by weight, particularly preferably from 2.21 to 4.21% by weight of 4,5-dimethylheptanol;

from 1.55 to 5.55% by weight, preferably from 2.05 to 5.05% by weight, particularly preferably from 2.55 to 4.55% by weight of 5,6-dimethylheptanol;

from 1.63 to 3.63% by weight, preferably from 1.83 to 3.43% by weight, particularly preferably from 2.13 to 3.13% by weight of 4-methyloctanol;

from 0.98 to 2.98% by weight, preferably from 1.18 to 2.78% by weight, particularly preferably from 1.48 to 2.48% by weight of 5-methyloctanol;

from 0.70 to 2.70% by weight, preferably from 0.90 to 2.50% by weight, particularly preferably from 1.20 to 2.20% by weight of 3,6,6-trimethylhexanol;

from 1.96 to 3.96% by weight, preferably from 2.16 to 3.76% by weight, particularly preferably from 2.46 to 3.46% by weight of 7-methyloctanol;

from 1.24 to 3.24% by weight, preferably from 1.44 to 3.04% by weight, particularly preferably from 1.74 to 2.74% by weight of 6-methyloctanol;

from 0.1 to 3% by weight, preferably from 0.2 to 2% by weight, particularly preferably from 0.3 to 1% by weight of n-nonanol;

from 25 to 35% by weight, preferably from 28 to 33% by weight, particularly preferably from 29 to 32% by weight of other alcohols having 9 and 10 carbon atoms; with the proviso that the entirety of the components mentioned gives 100% by weight.

In accordance with what has been said above, an isononanol mixture produced via cobalt-catalyzed hydroformylation and subsequent hydrogenation with use of an isooctene mixture produced by means of the PolyGas® process or EMOGAS® process with an ethylene-containing butene mixture as raw material can vary within the range of the compositions below, depending on the composition of the raw material and variations in the reaction conditions used:

from 6.0 to 16.0% by weight, preferably from 7.0 to 15.0% by weight, particularly preferably from 8.0 to 14.0% by weight of n-nonanol;

from 12.8 to 28.8% by weight, preferably from 14.8 to 26.8% by weight, particularly preferably from 15.8 to 25.8% by weight of 6-methyloctanol;

from 12.5 to 28.8% by weight, preferably from 14.5 to 26.5% by weight, particularly preferably from 15.5 to 25.5% by weight of 4-methyloctanol;

from 3.3 to 7.3% by weight, preferably from 3.8 to 6.8% by weight, particularly preferably from 4.3 to 6.3% by weight of 2-methyloctanol;

from 5.7 to 11.7% by weight, preferably from 6.3 to 11.3% by weight, particularly preferably from 6.7 to 10.7% by weight of 3-ethylheptanol;

from 1.9 to 3.9% by weight, preferably from 2.1 to 3.7% by weight, particularly preferably from 2.4 to 3.4% by weight of 2-ethylheptanol;

from 1.7 to 3.7% by weight, preferably from 1.9 to 3.5% by weight, particularly preferably from 2.2 to 3.2% by weight of 2-propylhexanol;

from 3.2 to 9.2% by weight, preferably from 3.7 to 8.7% by weight, particularly preferably from 4.2 to 8.2% by weight of 3,5-dimethylheptanol;

from 6.0 to 16.0% by weight, preferably from 7.0 to 15.0% by weight, particularly preferably from 8.0 to 14.0% by weight of 2,5-dimethylheptanol;

from 1.8 to 3.8% by weight, preferably from 2.0 to 3.6% by weight, particularly preferably from 2.3 to 3.3% by weight of 2,3-dimethylheptanol;

from 0.6 to 2.6% by weight, preferably from 0.8 to 2.4% by weight, particularly preferably from 1.1 to 2.1% by weight of 3-ethyl-4-methylhexanol;

from 2.0 to 4.0% by weight, preferably from 2.2 to 3.8% by weight, particularly preferably from 2.5 to 3.5% by weight of 2-ethyl-4-methylhexanol;

from 0.5 to 6.5% by weight, preferably from 1.5 to 6% by weight, particularly preferably from 1.5 to 5.5% by weight of other alcohols having 9 carbon atoms; with the proviso that the entirety of the components mentioned gives 100% by weight.

Decanol

Isodecanol which is used for the synthesis of the diisodecyl esters of the general formula (II) comprised in the plasticizer composition of the invention is not a unitary chemical compound, but instead is a complex mixture of differently branched isomeric decanols.

These are generally produced via nickel- or Brønsted-acid-catalyzed trimerization of propylene, for example by the PolyGas® process or the EMOGAS® process explained above, subsequent hydroformylation of the resultant isononene isomer mixture by means of homogeneous rhodium or cobalt carbonyl catalysts, preferably by means of cobalt carbonyl catalysts, and hydrogenation of the resultant isodecanal isomer mixture, e.g. by means of the catalysts and processes mentioned above in connection with the production of $C_7$-$C_9$-alcohols (Ullmann's Encyclopedia of Industrial Chemistry; $5^{th}$ edition, vol. A1, p. 293, VCH Verlagsgesellschaft GmbH, Weinheim 1985). The resultant isodecanol generally has a high degree of branching.

2-Propylheptanol used for the synthesis of the di(2-propylheptyl) esters of the general formula (II) comprised in the plasticizer composition of the invention can be pure 2-propylheptanol or can be propylheptanol isomer mixtures of the type generally formed during the industrial production of 2-propylheptanol and likewise generally termed 2-propylheptanol.

Pure 2-propylheptanol can be obtained via aldol condensation of n-valeraldehyde and subsequent hydrogenation of the resultant 2-propylheptanal, for example in accordance with U.S. Pat. No. 2,921,089. By virtue of the production process, commercially obtainable 2-propylheptanol generally comprises, alongside the main component 2-propylheptanol, one or more of the following isomers of 2-propylheptanol: 2-propyl-4-methylhexanol, 2-propyl-5-methylhexanol, 2-isopropylheptanol, 2-isopropyl-4-methylhexanol, 2-isopropyl-5-methylhexanol, and/or 2-propyl-4,4-dimethylpentanol. The presence of other isomers of 2-propylheptanol, for example 2-ethyl-2,4-dimethyl-hexanol, 2-ethyl-2-methylheptanol, and/or 2-ethyl-2,5-dimethylhexanol, in the 2-propyl-heptanol is possible, but because the rates of formation of the aldehydic precursors of these isomers in the aldol condensation are low, the amounts of these present in the 2-propylheptanol are only trace amounts, if they are present at all, and they play practically no part in determining the plasticizer properties of the compounds produced from these 2-propylheptanol isomer mixtures.

Various hydrocarbon sources can be utilized as starting material for the production of 2-propylheptanol, for example 1-butene, 2-butene, raffinate I—an alkane/alkene mixture which is obtained from the $C_4$-cut of a cracker after removal of allenes, of acetylenes, and of dienes and which also comprises, alongside 1- and 2-butene, considerable amounts of isobutene—or raffinate II, which is obtained from raffinate I via removal of isobutene and then comprises, as olefin components other than 1- and 2-butene, only small proportions of isobutene. It is also possible, of course, to use mixtures of raffinate I and raffinate II as raw material for the production of 2-propylheptanol. These olefins or olefin mixtures can be hydroformylated by methods that are conventional per se with cobalt or rhodium catalysts, and 1-butene here gives a mixture of n- and isovaleraldehyde—the term isovaleraldehyde designating the compound 2-methylbutanal, the n/iso ratio of which can vary within relatively wide limits, depending on catalyst used and on hydroformylation conditions. By way of example, when a triphenylphosphine-modified homogeneous rhodium catalyst (Rh/TPP) is used, n- and isovaleraldehyde are formed in an n/iso ratio that is generally from 10:1 to 20:1 from 1-butene, whereas when rhodium hydroformylation catalysts modified with phosphite ligands are used, for example in accordance with U.S. Pat. No. 5,288,918 or WO 05028407, or when rhodium hydroformylation catalysts modified with phosphoamidite ligands are used, for example in accordance with WO 0283695, n-valeraldehyde is formed almost exclusively. While the Rh/TPP catalyst system converts 2-butene only very slowly in the hydroformylation, and most of the 2-butene can therefore be reclaimed from the hydroformylation mixture, 2-butene is successfully hydroformylated with the phosphite-ligand- or phosphorus amidite ligand-modified rhodium catalysts mentioned, the main product formed being n-valeraldehyde. In contrast, isobutene comprised within the olefinic raw material is hydroformylated at varying rates by practically all catalyst systems to 3-methylbutanal and, in the case of some catalysts, to a lesser extent to pivalaldehyde.

The $C_5$-aldehydes obtained in accordance with starting materials and catalysts used, i.e. n-valeraldehyde optionally mixed with isovaleraldehyde, 3-methylbutanal, and/or pivalaldehyde, can be separated, if desired, completely or to some extent by distillation into the individual components prior to the aldol condensation, and here again there is therefore a possibility of influencing and of controlling the composition of isomers of the $C_{10}$-alcohol component of the ester mixtures used in the process of the invention. Equally, it is possible that the $C_5$-aldehyde mixture formed during the hydroformylation is introduced into the aldol condensation without prior isolation of individual isomers. If n-valeraldehyde is used in the aldol condensation, which can be carried out by means of a basic catalyst, for example an aqueous solution of sodium hydroxide or of potassium hydroxide, for example by the processes described in EP-A 366089, U.S. Pat. No. 4,426,524, or U.S. Pat. No. 5,434,313, 2-propylheptanal is produced as sole condensate, whereas if a mixture of isomeric $C_5$-aldehydes is used the product comprises an isomer mixture of the products of the homoaldol condensation of identical aldehyde molecules and of the crossed aldol condensation of different valeraldehyde isomers. The aldol condensation can, of course, be controlled via targeted reaction of individual isomers in such a way that a single aldol condensation isomer is formed predominantly or entirely. The relevant aldol condensates can then be hydrogenated with conventional hydrogenation catalysts, for example those mentioned above for the hydrogenation of aldehydes, to give the corresponding alcohols or alcohol mixtures, usually after preceding, preferably distillative isolation from the reaction mixture and, if desired, distillative purification.

As mentioned above, the compounds of the general formula (II) comprised in the plasticizer composition of the invention can have been esterified with pure 2-propylheptanol. However, production of said esters generally uses mixtures of 2-propyl-heptanol with the propylheptanol isomers mentioned in which the content of 2-propyl-heptanol is at least 50% by weight, preferably from 60 to 98% by weight, and particularly preferably from 80 to 95% by weight, in particular from 85 to 95% by weight.

Suitable mixtures of 2-propylheptanol with the propylheptanol isomers comprise by way of example those of from 60 to 98% by weight of 2-propylheptanol, from 1 to 15% by weight of 2-propyl-4-methylhexanol, and from 0.01 to 20% by weight of 2-propyl-5-methylhexanol, and from 0.01 to 24% by weight of 2-isopropylheptanol, where the sum of the proportions of the individual constituents does not exceed 100% by weight. It is preferable that the proportions of the individual constituents give a total of 100% by weight.

Other suitable mixtures of 2-propylheptanol with the propylheptanol isomers comprise by way of example those of from 75 to 95% by weight of 2-propylheptanol, from 2 to 15% by weight of 2-propyl-4-methylhexanol, from 1 to 20% by weight of 2-propyl-5-methylhexanol, from 0.1 to 4% by weight of 2-isopropylheptanol, from 0.1 to 2% by weight of 2-isopropyl-4-methylhexanol, and from 0.1 to 2% by weight of 2-isopropyl-5-methylhexanol, where the sum of the proportions of the individual constituents does not exceed 100% by weight. It is preferable that the proportions of the individual constituents give a total of 100% by weight.

Preferred mixtures of 2-propylheptanol with the propylheptanol isomers comprise those with from 85 to 95% by weight of 2-propylheptanol, from 5 to 12% by weight of 2-propyl-4-methylhexanol, and from 0.1 to 2% by weight of 2-propyl-5-methylhexanol, and from 0.01 to 1% by weight of 2-isopropylheptanol, where the sum of the proportions of the individual constituents does not exceed 100% by weight. It is preferable that the proportions of the individual constituents give a total of 100% by weight.

When the 2-propylheptanol isomer mixtures mentioned are used instead of pure 2-propylheptanol for the production of the compounds of the general formula (II), the isomer composition of the alkyl ester groups and, respectively alkyl ether groups corresponds in practical terms to the composition of the propylheptanol isomer mixtures used for the esterification.

Undecanol

The undecanols used for the production of the compounds of the general formula (II) comprised in the plasticizer composition of the invention can be straight-chain or branched, or can be composed of mixtures of straight-chain and branched undecanols. It is preferable to use, as alcohol component, mixtures of branched undecanols, also termed isoundecanol.

Substantially straight-chain undecanol can be obtained via rhodium- or preferably cobalt-catalyzed hydroformylation of 1-decene and subsequent hydrogenation of the resultant n-undecanal. The starting olefin 1-decene is produced by way of the SHOP process mentioned previously for the production of 1-octene.

For the production of branched isoundecanol, the 1-decene obtained in the SHOP process can be subjected to skeletal isomerization, for example by means of acidic zeolitic molecular sieves, as described in WO 9823566, whereupon mixtures of isomeric decenes are formed, rhodium- or preferably cobalt-catalyzed hydroformylation of which, with subsequent hydrogenation of the resultant isoundecanal mixtures, gives the isoundecanol used for the production of the compounds (II) used in the invention. Hydroformylation of 1-decene or of isodecene mixtures by means of rhodium or cobalt catalysis can be achieved as described previously in connection with the synthesis of $C_7$-$C_{10}$-alcohols. Similar considerations apply to the hydrogenation of n-undecanal or of isoundecanal mixtures to give n-undecanol and, respectively, isoundecanol.

After distillative purification of the hydrogenation product, the resultant $C_7$-$C_{11}$-alkyl alcohols or a mixture of these can be used as described above for the production of the diester compounds of the general formula (II) used in the invention.

Dodecanol

Substantially straight-chain dodecanol can be obtained advantageously by way of the Alfol® process or Epal® process. These processes include the oxidation and hydrolysis of straight-chain trialkylaluminum compounds which are constructed stepwise by way of a plurality of ethylation reactions, starting from triethylaluminum, with use of Ziegler-Natta catalysts. The desired n-dodecanol can be obtained from the resultant mixtures of substantially straight-chain alkyl alcohols of varying chain length after distillative discharge of the $C_{12}$-alkyl alcohol fraction.

Alternatively, n-dodecanol can also be produced via hydrogenation of natural fatty acid methyl esters, for example from coconut oil.

Branched isododecanol can be obtained by analogy with the known processes for the codimerization and/or oligomerization of olefins, as described by way of example in WO 0063151, with subsequent hydroformylation and hydrogenation of the isoundecene mixtures, as described by way of example in DE-A 4339713. After distillative purification of the hydrogenation product, the resultant isododecanols or mixtures of these can be used as described above for the production of the diester compounds of the general formula (II) used in the invention.

Plastisol Applications

As described above, the good gelling properties of the plasticizer composition of the invention makes it particularly suitable for the production of plastisols.

The invention therefore further provides the use of a plasticizer composition as defined above as plasticizer in a plastisol.

Plastisols can be produced from various plastics. In one preferred embodiment, the plastisols of the invention are PVC plastisols.

The proportion of plasticizer composition of the invention in the PVC plastisols is usually from 5 to 300 phr, preferably from 50 to 200 phr.

Plastisols are usually converted to the form of the finished product at ambient temperature via various processes, such as spreading processes, screen printing processes, casting processes, for example the slush molding process or rotomolding process, dip-coating processes, spray processes, and the like. Gelling then takes place via heating, whereupon cooling gives a homogeneous product with relatively high or relatively low flexibility.

PVC plastisols are particularly suitable for the production of PVC foils, for the production of seamless hollow bodies and of gloves, and for use in the textile sector, e.g. for textile coatings.

The PVC plastisols based on the plasticizer composition of the invention are specifically suitable for the production of synthetic leather, e.g. of synthetic leather for vehicle construction; underbody protection for motor vehicles; seam-sealing materials; carpet-back coatings; high-weight coatings; conveyor belts; dip-coatings, and items produced by means of dip-coating processes; toys, for example dolls, balls, or toy animals; anatomical models for training purposes; floor coverings; wallcoverings; (coated) textiles, for example Latex apparel, protective apparel or rainproof apparel, for example rainproof jackets; tarpaulins; tenting; belt coatings; roof sheeting; sealing compositions for closures; respiratory masks, and gloves.

Molding Composition Applications

The molding composition of the invention is preferably used for the production of moldings and foils. Among these are in particular housings of electrical devices, for example of kitchen devices, and computer housings; tooling; equipment; piping; cables; hoses, for example plastics hoses, water hoses and irrigation hoses, industrial rubber hoses, or chemicals hoses; wire sheathing; window profiles; vehicle-construction components, for example bodywork constituents, vibration dampers for engines; tires; furniture, for example chairs, tables, or shelving; foam for cushions and mattresses; gaskets; composite foils, such as foils for laminated safety glass, in particular for vehicle windows and/or window panes, recording discs; packaging containers; adhesive-tape foils, or coatings.

The molding composition of the invention is also suitable for the production of moldings and foils which come directly into contact with people or with foods. These are primarily medical products, hygiene products, packaging for food or drink, products for the interior sector, toys and child-care items, sports-and-leisure products, apparel, fibers for textiles, and the like.

The medical products which can be produced from the molding composition of the invention are by way of example tubes for enteral nutrition and hemodialysis, breathing tubes, infusion tubes, infusion bags, blood bags, catheters, tracheal tubes, disposal syringes, gloves, or respiratory masks.

The packaging that can be produced from the molding composition of the invention for food or drink is by way of example freshness-retention foils, food-or-drink hoses, drinking-water hoses, containers for storing or freezing food or drink, lid gaskets, closure caps, crown corks, or synthetic corks for wine.

The products which can be produced from the molding composition of the invention for the interior sector are by way of example ground-coverings, which can be of homogeneous structure or can be composed of a plurality of layers, for example of at least one foamed layer, examples being floorcoverings, sports floors, or luxury vinyl tiles (LVTs), synthetic leathers, wallcoverings, or foamed or unfoamed wallpapers, in buildings, or can be cladding or console covers in vehicles.

The toys and child-care items which can be produced from the molding composition of the invention are by way of example dolls, inflatable toys, such as balls, toy figures, modeling clays, swimming aids, stroller covers, baby-changing mats, bedwarmers, teething rings, or bottles.

The sports-and-leisure products that can be produced from the molding composition of the invention are by way of example gymnastics balls or other balls, exercise mats, seat cushions, massage balls and massage rolls, shoes and shoe soles, air mattresses, or drinking bottles.

The apparel that can be produced from the molding compositions of the invention is by way of example rubber boots.

Non-PVC Applications

The present invention also includes the use of the plasticizer composition of the invention as and/or in auxiliaries selected from: calendering auxiliaries; rheology auxiliaries; surfactant compositions, such as flow aids and film-forming aids, defoamers, antifoams, wetting agents, coalescing agents, and emulsifiers; lubricants, such as lubricating oils, lubricating greases, and lubricating pastes; quenchers for chemical reactions; phlegmatizing agents; pharmaceutical products; plasticizers in adhesives; impact modifiers, and antiflow additives.

The figures described below and the examples provide further explanation of the invention. These figures and examples are not to be understood as restricting the invention.

The following abbreviations are used in the examples and figures below:
2,5-FDCA for 2,5-furandicarboxylic acid,
2,5-THFDCA for 2,5-tetrahydrofurandicarboxylic acid,
DINP for diisononyl phthalate,
DMAP for 4-dimethylaminopyridine,
TBME for tert-butyl methyl ether,
THF for tetrahydrofuran,
phr for parts by weight per 100 parts by weight of polymer.

DESCRIPTION OF FIGURES

FIG. 1:
FIG. 1 shows the gelling behavior of PVC plastisols with in each case a total proportion of 60 phr of plasticizer composition of the invention. Plasticizer compositions of the invention used here comprise the commercially available plasticizer Hexamoll® DINCH®, and various amounts of the rapid-gelling agent 2,5-THFDCA dibutyl ester. The gelling behavior of PVC plastisols which comprise exclusively the commercially available plasticizers Hexamoll® DINCH® or Palatinol® N (DINP) is also shown as comparison. The viscosity of the plastisols is presented as a function of temperature.

EXAMPLES

I) Examples of Production of Compounds (I) Used in the Invention

Example 1

Synthesis of di(n-butyl) 2,5-tetrahydrofurandicarboxylate from dimethyl 2,5-furandicarboxylate via transesterification and hydrogenation Example 1.1

Production of dimethyl 2,5-furandicarboxylate (=step a)

3.30 kg of methanol were used as initial charge together with 0.10 kg of concentrated sulfuric acid in a 10 L glass reactor equipped with heating jacket, reflux condenser, and mechanical stirrer. 1.6 kg of 2,5-furandicarboxylic acid (2,5-FDCA) were slowly added to this mixture, with vigorous stirring. The dense white suspension that forms was then heated to 70° C. (reflux). The course of the reaction was monitored by means of HPLC analysis, whereupon after about 20 h a clear solution was obtained, with complete conversion of the 2,5-FDCA. The reaction mixture was then cooled to 65° C., and neutralized with saturated $NaHCO_3$ solution and solid $NaHCO_3$ (pH 7). During the neutralization, a dense white suspension again formed, and was cooled to 10° C., stirred for a further 0.5 h, and then filtered by way of a P2 sintered glass frit. The filtercake was washed three times with 1 L of cold water, whereupon about 2 kg of wet solid was obtained.

For purification and recrystallization, the wet solid was added to 6.00 kg of 2-butanone in a 10 L glass reactor equipped with heating jacket, reflux condenser, and mechanical stirrer. The suspension was heated to 70° C., whereupon a clear solution was obtained. 1.00 kg of water was then added, and this led to formation of a brownish orange aqueous phase. It was sometimes necessary to add 900 mL of saturated sodium chloride solution in order to achieve phase separation. The aqueous phase was removed, and the organic phase was cooled to 20° C., without stirring, whereupon the crystallization of the product began (usually at about 35° C.). The crystalline suspension was then cooled to 0° C. and stirred overnight. The suspension was then filtered by way of a P2 sintered glass frit, and the filtercake was washed with 1 L of cold methanol. The solid residue was dried at room temperature in vacuo. The desired dimethyl 2,5-furan-dicarboxylate was obtained in a yield of from 50 to 60% and in a purity of >99%. The identity and purity of the final product was determined by means of NMR and HPLC (HPLC column: Varian Polaris 3μ. C18-A, 150× 4.6 mm).

Example 1.2

Catalytic Hydrogenation (=Step b2)

A 20% by weight solution of dimethyl 2,5-furandicarboxylate in THF was charged to a nitrogen-filled 2.5 L Hastelloy C autoclave from Parr Instrument, equipped with a mechanical stirrer with magnetic coupling, thermocouple, sampling tube, and baffles. 120 g of a heterogeneous Pd/Pt catalyst (0.4% by weight of Pd/0.4% by weight of Pt on $ZrO_2$, produced by analogy with DE 4429014, example 6) were then added, and the nitrogen atmosphere was replaced by a hydrogen atmosphere by filling and ventilating the autoclave with hydrogen three times. The final pressure of hydrogen was increased to 200 bar, and the autoclave was heated to 180° C. The progress of the reaction was monitored by means of GC analysis. After complete conversion (usually after from 40 to 60 hours), the autoclave was cooled and ventilated, and the contents were filtered in order to remove the solid catalyst. The solvent in the filtrate was then removed by distillation under reduced pressure, and the retained crude product was diluted in 300 mL of tert-butyl methyl ether and transferred to a separating funnel. The organic phase was washed twice with saturated $NaHCO_3$ solution and once with saturated sodium chloride solution. The solvent and other volatile constituents were then removed by distillation under reduced pressure. The crude product was purified by fractional distillation, whereupon dimethyl 2,5-tetrahydrofurandicarboxylate was obtained in the form of colorless to brownish, viscous liquid. The desired dimethyl 2,5-tetrahydrofurandicarboxylate was obtained here in a yield of 57% and in a purity of 98.2%. The identity and purity of the final product were determined by means of NMR and GC-MS analysis (GC column: Agilent J&W DB-5, 30 m×0.32 mm×1.0 µm).

Example 1.3

Transesterification of dimethyl 2,5-tetrahydrofurandicarboxylate (=step c2)

204 g (1.08 mol, 1.0 equivalent) of dimethyl 2,5-tetrahydrofurandicarboxylate were dissolved in 200 g of n-heptane in a 2 L round-necked flask equipped with a dropping funnel with pressure equalization, and 325 g (4.38 mol, 4.0 equivalents) of n-butanol, and also a mixed titanium(IV) propoxide/butoxide complex (3 mol % of titanium) were added. The mixture was heated to reflux (from 100 to 126° C.) for 22 hours, with stirring. The course of the reaction was monitored by means of GC analysis. After complete conversion, the reaction mixture was cooled to room temperature and filtered, and the titanium(IV) alkoxide was hydrolyzed via addition of 100 mL of water. The two-phase mixture was transferred to a separating funnel, the aqueous phase was removed, and the organic phase was washed once with saturated sodium chloride solution. The solvent and other volatile constituents were then removed by distillation under reduced pressure. The crude product was purified by means of fractional distillation, whereupon di(n-butyl) 2,5-tetrahydrofurandicarboxylate was obtained in the form of clear colorless liquid in a yield of 72% and in a purity of 98.3%. The identity and purity of the final product was determined by means of NMR and GC-MS analysis (GC column: Agilent J&W DB-5, 30 m×0.32 mm×1.0 µm).

Example 2

Synthesis of di(n-butyl) 2,5-tetrahydrofurandicarboxylate via direct esterification and hydrogenation Example 2.1

Production of di(n-butyl) 2,5-furandicarboxylate (=step b1)

445 g (6.00 mol, 4.0 equivalents) of n-butanol were used as initial charge in 500 g of toluene in a 2 L round-necked flask equipped with a Dean-Stark water separator and a dropping funnel with pressure equalization. The mixture was heated to reflux, with stirring, and 234 g (1.50 mol, 1.0 equivalent) of 2,5-furandicarboxylic acid were added, followed by 11.5 g (0.12 mol, 8 mol %) of 99.9% by weight sulfuric acid in from 3 to 4 portions whenever the reaction slowed. The course of the reaction was monitored on the basis of the amount of water separated in the Dean-Stark apparatus. After complete conversion, a specimen was taken from the reaction mixture and analyzed by GC. The reaction mixture was cooled to room temperature, transferred to a separating funnel, and washed twice with saturated NaHCO₃ solution. The organic phase was washed with saturated sodium chloride solution and dried with anhydrous $Na_2SO_4$, and the solvent was removed under reduced pressure. The crude product was purified by means of fractional distillation. The desired di(n-butyl) 2,5-furandicarboxylate was obtained here in a yield of 80% and in a purity of 98.9%. The identity and purity of the final product was determined by means of NMR and GC-MS analysis (GC column: Agilent J&W DB-5, 30 m×0.32 mm×1.0 µm or Ohio Valley OV-1701 60 m×0.32 mm×0.25 µm).

Catalytic Hydrogenation (=Step c1):

A 20% by weight solution of di(n-butyl) 2,5-furandicarboxylate in THF was charged to a nitrogen-filled 2.5 L Hastelloy C autoclave from Parr Instrument, equipped with a mechanical stirrer with magnetic coupling, thermocouple, sampling tube, and baffles. 120 g of a heterogeneous Pd/Pt catalyst (0.4% by weight of Pd/0.4% by weight of Pt on $ZrO_2$, produced by analogy with DE 4429014, example 6) were then added, and the nitrogen atmosphere was replaced three times with hydrogen at superatmospheric pressure. The final pressure of hydrogen was increased to 200 bar, and the autoclave was heated to 180° C. The progress of the reaction was monitored by means of GC analysis. After complete conversion (usually after from 40 to 60 hours), the autoclave was ventilated, and the contents were filtered in order to remove the solid catalyst. The solvent in the filtrate was then removed by distillation under reduced pressure, and the retained crude product was diluted in 300 mL of TBME and transferred to a separating funnel. The organic phase was washed twice with saturated NaHCO₃ solution and once with saturated sodium chloride solution. The solvent and other volatile constituents were then removed by distillation under reduced pressure. The crude product was purified by fractional distillation, and di(n-butyl) 2,5-tetrahydrofurandicarboxylate was obtained in the form of colorless to brownish, viscous liquid in a yield of 30% and in a purity of 97.9%. The identity and purity of the final product were determined by means of NMR and GC-MS analysis (GC column: Agilent J&W DB-5, 30 m×0.32 mm×1.0 µm).

Example 3

Synthesis of the di-n-butyl ether of 2,5-di(hydroxymethyl)tetrahydrofuran 10.6 g of 2,5-di(hydroxymethyl)tetrahydrofuran (80 mmol, 1.0 equivalent) were dissolved in 140 ml of toluene in a 500 mL four-necked flask equipped with a mechanical stirrer, dropping funnel, thermometer, and reflux condenser. 22.4 g (400 mmol, 5.0 equivalents) of powdered KOH were added in portions to this mixture at room temperature over a period of 30 minutes and with continuous stirring. The mixture was then stirred at reflux for from 3 to 4 hours. 60.0 g of molecular sieve (3 Å) were then added, and the mixture was stirred at reflux for a further hour, whereupon a cream-colored suspension was obtained. The mixture was cooled to 90° C., and 28.5 g (208 mmol, 2.6 equivalents) of 1-bromobutane dissolved in 40 mL of toluene were added dropwise over 1.5 hours. The dropping funnel was washed with 20 mL of toluene, and the wash solution was combined with the reaction mixture. The course of the reaction was monitored by means of GC analysis. After the end of the reaction, (usually from 40 to 80 hours) the mixture was cooled to room temperature. The glass containers were washed with TBME, the washing solution was combined with the reaction mixture, and the resultant white suspension was filtered. The salt residues removed by filtration were washed with TBME. The combined organic phases were in each case washed in succession once with saturated sodium chloride solution, with saturated ammonium chloride solution, and again with saturated sodium chloride solution, and finally dried over $Na_2SO_4$. The solvent and other volatile constituents were then removed by distillation under reduced pressure, and the residue was dried under high vacuum. The crude product was purified by means of fractional distillation, whereupon the di-n-butyl ether of 2,5-di(hydroxymethyl)tetrahydrofuran was obtained in the form of clear colorless liquid in a yield of 55% and in a purity of 98.7%. The identity and purity of the final product were determined by means of NMR and GC-MS analysis (GC column: Agilent J&W DB-5, 30 m×0.32 mm×1.0 µm).

II) Performance Testing

II.a) Determination of Solvation Temperature in Accordance with DIN 53408

To characterize the gelling performance of the compounds (I) used in the invention in PVC, the solvation temperature was determined in accordance with DIN 53408. In accordance with DIN 53408, a droplet of a slurry of 1 g of PVC in 19 g of plasticizer is observed in transmitted light under a microscope equipped with a heatable stage. The temperature here is increased linearly by 2° C. per minute, starting at 60° C. The solvation temperature is the temperature at which the PVC particles become invisible, i.e. it is no longer possible to discern their outlines and contrasts. The lower the solvation temperature, the better the gelling performance of the relevant substance for PVC.

The table below lists the solvation temperatures of the di(n-butyl) 2,5-tetrahydrofurandicarboxylate plasticizer and, as comparison, of Mesamoll® TP-LXS 5106, and also of dibutyl phthalate.

| Ex. No. | Substance | Solvation temperature in accordance with DIN 53408 [° C.] |
|---|---|---|
| 1 | Di(n-butyl) 2,5-tetrahydrofurandicarboxylate | 71 |
| Comp 1 | Mesamoll ® TP-LXS 51067[1)] | 114 |
| Comp 2 | Dibutyl phthalate[2)] | 100 |

[1)]Mixture of phenyl alkylsulfonates from Lanxess Deutschland GmbH (CAS No. 91082-17-6)
[2)]Di(n-butyl) benzene-1,2-dicarboxylate (CAS No. 84-74-2)

As can be seen from the table, di(n-butyl) 2,5-tetrahydrofurandicarboxylate exhibits the lowest solvation temperature.

II.b) Physical Properties

The table below lists the most significant physical properties of di(n-butyl) 2,5-tetra-hydrofurandicarboxylate (example 1) in comparison with the Mesamoll® TP-LXS 51067 plasticizer used in the market (comparative example comp 1).

| | Plasticizer: | |
|---|---|---|
| | Di(n-butyl) 2,5-tetrahydrofuran-dicarboxylate | Mesamoll ® TP-LXS 51067 |
| Density (20° C.) [g/cm³] | 1.048 | 1.071 |
| Viscosity (20° C.) [mPa · s] | 10 | 90 |

Relevant physical properties for the plasticizer application alongside the solvation temperature in accordance with DIN 53408 are specifically density and viscosity. In comparison with the plasticizer Mesamoll® TP-LXS 51067, which is commercially available and regarded as having advantageous properties, 2,5-THFDCA dibutyl ester exhibits markedly lower, and therefore more advantageous, viscosity with comparable density.

II.c) Determination of Gelling Behavior of PVC Plastisols

In order to investigate the gelling behavior of PVC plastisols based on the plasticizer compositions of the invention, PVC plastisols which comprise the commercially available plasticizer Hexamoll® DINCH® and various amounts of the rapid-gelling agent 2,5-THFDCA dibutyl ester (from 5 to 10% by weight, based on the plasticizer composition used) were produced in accordance with the following formulation:

| Additive | phr |
|---|---|
| Solvin 372 NF[3)] | 100 |
| Plasticizer composition of the invention | 60 |
| Reagent SLX 781[4)] | 2 |

[3)]Commercially available PVC from Solvin GmbH & Co. KG, produced by suspension polymerization (K value in accordance with ISO 1628-2: 73)
[4)]Liquid Ba—Zn stabilizer from Reagens Deutschland GmbH Plastisols which comprise exclusively the commercially available plasticizers Hexamoll® DINCH® or Palatinol® N (DINP) were also produced as comparison.

The plastisols were produced by using a dissolver with stirring at about 800 revolutions/minute to add the PVC to the weighed charge of mixture of the plasticizer composition of the invention and heat stabilizer. Once PVC addition had ended, the mixture was homogenized for 2.5 minutes at 2500 revolutions/minute and then deaerated in vacuo in a desiccator.

In order to gel a liquid PVC plastisol and to convert it from the condition of PVC particles homogeneously dispersed in plasticizer to a homogeneous, solid flexible PVC matrix, the energy necessary for this purpose has to be introduced in the form of heat. Parameters available for this purpose during processing are temperature and residence time. The faster the gelling (the indicator here being the solvation temperature, i.e. the lower this temperature the faster is the gelling of the material) the lower the temperature that can be selected (for identical residence time) or the lower the residence time that can be selected (for identical temperature).

The gelling behavior of a plastisol is investigated by an in-house method with an Anton Paar MCR101 rheometer. The viscosity of the paste is measured here with heating under constant shear (rotation). The measurement uses a plate-on-plate system (PP50) beginning at 30° C. with a shear rate of 10 l/s and with a heating rate of 5° C./minute.

The viscosity of a plastisol generally decreases initially with rising temperature, and reaches a minimum. The viscosity then in turn rises. The temperature at the minimum of the curve and the steepness of the rise after the minimum provide information about the gelling behavior, i.e. the lower the temperature at the minimum and the steeper the subsequent rise, the better or faster the gelling.

As can be seen very clearly from FIG. 1, when the PVC plastisol with the plasticizer composition of the invention is compared with the PVC plastisol comprising exclusively the commercially available plasticizer Hexamoll® DINCH®, it gels markedly more quickly and at substantially lower temperatures. The viscosity of the PVC plastisols which comprise the plasticizer composition of the invention is moreover, in the ungelled state, i.e. at temperatures below the gelling temperature, markedly lower than that of a PVC plastisol which comprises exclusively the commercially available plasticizer Palatinol® N (DINP).

The invention claimed is:
1. A plasticizer composition comprising
a) at least one compound of the general formula (I),

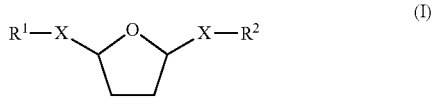

in which
X is *—(C=O)—O—, *—(CH$_2$)$_n$—O—, or *—(CH$_2$)$_n$—O—(C=O)—, where * represents the point of linkage to the tetrahydrofuran ring, and n has the value 0, 1, or 2;
and
R$^1$ and R$^2$ are selected mutually independently from C$_4$-C$_5$-alkyl and C$_5$-C$_6$-cycloalkyl, where the cycloalkyl moieties are unsubstituted or can be substituted by at least one C$_1$-C$_{10}$-alkyl moiety, and
b) at least one compound of the general formula (II),

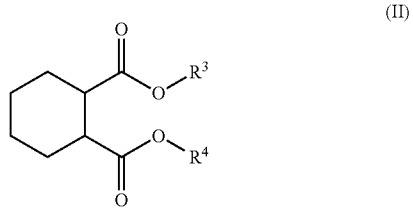

in which
R3 and R4 are selected mutually independently from branched and unbranched C7-C12-alkyl moieties.

2. The plasticizer composition according to claim 1, where R1 and R2 in the compounds of the general formula (I) are mutually independently an unbranched or branched C4-alkyl moiety.

3. The plasticizer composition according to claim 1, where both of R1 and R2 in the compounds of the general formula (I) are n-butyl, or both are isobutyl.

4. The plasticizer composition according to claim 1, where both of the groups X in the compounds of the general formula (I) are *—(C=O)—O—.

5. The plasticizer composition according to claim 1, where both of R3 and R4 in the compounds of the general formula (II) are 2-ethylhexyl or both are isononyl, or both are 2-propylheptyl.

6. The plasticizer composition according to claim 1, where the plasticizer composition optionally comprises another plasticizer which differs from the compounds (I) and (II) and which is selected from dialkyl phthalates, alkyl aralkyl phthalates, 1,2-cyclohexanedicarboxylic esters differing from compounds (II), dialkyl terephthalates, trialkyl trimellitates, alkyl benzoates, dibenzoic esters of glycols, hydroxybenzoic esters, esters of saturated mono and dicarboxylic acids, esters of unsaturated dicarboxylic acids, amides and esters of aromatic sulfonic acids, alkylsulfonic esters, glycerol esters, isosorbide esters, phosphoric esters, citric triesters, alkylpyrrolidone derivatives, 2,5-tetrahydrofurandicarboxylic esters which differ from compounds (I), epoxidized vegetable oils, epoxidized fatty acid monoalkyl esters, and polyesters made of aliphatic and/or aromatic polycarboxylic acids with at least dihydric alcohols.

7. The plasticizer composition according to claim 1, where the content of compounds of the general formula (I) in the plasticizer composition is from 1 to 50% by weight.

8. The plasticizer composition according to claim 1, where the content of compounds of the general formula (II) in the plasticizer composition is from 10 to 99% by weight.

9. The plasticizer composition according to claim 1, where the ratio by weight of compounds of the general formula (I) to compounds of the general formula (II) is in the range from 1:100 to 1:1.

10. A molding composition comprising at least one polymer and at least one plasticizer composition as defined in claim 1.

11. The molding composition according to claim 10, where the polymer is a thermoplastic polymer selected from homo- and copolymers which comprise at least one copolymerized monomer selected from C2-C10-monoolefins, 1,3-butadiene, 2-chloro-1,3-butadiene, vinyl alcohol and its C2-C10-alkyl esters, vinyl chloride, vinylidene chloride, vinylidene fluoride, tetrafluoroethylene, glycidyl acrylate, glycidyl methacrylate, acrylates and methacrylates of C1-C10-alcohols, vinylaromatics, (meth)acrylonitrile, maleic anhydride, and α,β-ethylenically unsaturated mono- and dicarboxylic acids,
homo- and copolymers of vinyl acetals,
polyvinyl esters,
polycarbonates,
polyesters,
polyethers,
polyether ketones,
thermoplastic polyurethanes,
polysulfides,
polysulfones,
polyether sulfones,
cellulose alkyl esters,
and mixtures thereof.

12. The molding composition according to claim 11, where the thermoplastic polymer is selected from polyvinyl chloride (PVC), polyvinyl butyral (PVB), homo and copolymers of vinyl acetate, homo and copolymers of styrene, polyacrylates, thermoplastic polyurethanes (TPU), or polysulfides.

13. The molding composition according to claim 11, where the thermoplastic polymer is polyvinyl chloride (PVC).

14. The molding composition according to claim 13, where the content of the plasticizer composition in the molding composition is from 1.0 to 300 phr.

15. The molding composition according to claim 11, comprising at least one thermoplastic polymer which differs from polyvinyl chloride, where the content of the plasticizer composition in the molding composition is from 0.5 to 300 phr.

16. The molding composition according to claim 10, where the polymer is an elastomer.

17. The molding composition according to claim 16, where the content of the plasticizer composition in the molding composition is from 1.0 to 60 phr.

18. A plasticizer for thermoplastic polymers or elastomers which comprises the plasticizer composition according to claim 1.

19. A plasticizer in a plastisol which comprises the plasticizer composition as defined in claim 1.

20. The molding as claimed in claim 10, wherein the molding is a molding for housings of electrical devices, computer housings, tooling, piping, cables, hoses, wire sheathing, window profiles, vehicle-construction components, tires, furniture, cushion foam and mattress foam, tarpaulins, gaskets, composite foils, recording discs, synthetic leather, packaging containers, adhesive-tape foils, or coatings.

* * * * *